US011062625B2

(12) United States Patent
Lin et al.

(10) Patent No.: US 11,062,625 B2
(45) Date of Patent: Jul. 13, 2021

(54) IMITATING LUNG DEVICE, SYSTEM FOR SIMULATING HUMAN LUNG, METHOD FOR SIMULATING HUMAN BREATHING, SYSTEM FOR SIMULATING DEPOSITION OF SUBSTANCE IN HUMAN LUNG AND METHOD OF THE SAME

(71) Applicant: NATIONAL TSING HUA UNIVERSITY, Hsinchu (TW)

(72) Inventors: Chun-Kai Lin, Hsinchu (TW); Jen-Huang Huang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 179 days.

(21) Appl. No.: 16/564,748

(22) Filed: Sep. 9, 2019

(65) Prior Publication Data
US 2020/0160752 A1    May 21, 2020

(30) Foreign Application Priority Data

Nov. 19, 2018  (TW) .................................. 107141097

(51) Int. Cl.
*G09B 23/30* (2006.01)
*G09B 23/34* (2006.01)

(52) U.S. Cl.
CPC ........... *G09B 23/303* (2013.01); *G09B 23/34* (2013.01)

(58) Field of Classification Search
CPC ................................ G09B 23/28; G09B 23/30
See application file for complete search history.

(56) References Cited

U.S. PATENT DOCUMENTS

| | | | | |
|---|---|---|---|---|
| 4,167,070 A | * | 9/1979 | Orden | G09B 23/32 434/272 |
| 5,397,237 A | * | 3/1995 | Dhont | G09B 5/10 434/262 |
| 5,597,310 A | * | 1/1997 | Edde | G09B 23/30 434/262 |
| 5,975,748 A | * | 11/1999 | East, IV | G09B 23/28 703/6 |
| 6,706,020 B1 | | 3/2004 | Urich | |
| 6,874,501 B1 | * | 4/2005 | Estetter | G09B 23/288 128/205.13 |

(Continued)

FOREIGN PATENT DOCUMENTS

JP   2016002438 A   1/2016
TW   M411947 U     9/2011

*Primary Examiner* — Kurt Fernstrom
(74) *Attorney, Agent, or Firm* — Hayes Soloway PC

(57) ABSTRACT

An imitating lung device includes a first liquid accommodating layer, a first elastic membrane, an airway layer, a second elastic membrane and a second liquid accommodating layer. A first liquid chamber is formed in an inner surface portion of the first liquid accommodating layer. The airway layer includes a plurality of air channels and a plurality of imitating alveolar regions. The imitating alveolar regions are communicated with the air channels. The air channels simulate a branched structure of the 15th generation to the 19th generation of a human lung, and the imitating alveolar regions simulate a branched structure of the 20th generation to the 23th generation of a human lung. A second liquid chamber is formed in an inner surface portion of the second liquid accommodating layer.

20 Claims, 17 Drawing Sheets

(56) References Cited

U.S. PATENT DOCUMENTS

| | | | | |
|---|---|---|---|---|
| 6,910,896 B1* | 6/2005 | Owens | ............... | G09B 23/288 |
| | | | | 434/267 |
| 6,921,267 B2* | 7/2005 | van Oostrom | ....... | G09B 23/288 |
| | | | | 434/262 |
| 7,128,578 B2* | 10/2006 | Lampotang | ............ | G09B 23/12 |
| | | | | 434/365 |
| 7,344,378 B2* | 3/2008 | Ichikawa | ............... | G09B 23/12 |
| | | | | 434/276 |
| 7,402,819 B2* | 7/2008 | Saracen | ................ | A61B 6/08 |
| | | | | 250/252.1 |
| 10,124,126 B2 | 11/2018 | Borden et al. | | |
| 2002/0143397 A1 | 10/2002 | von Segesser | | |
| 2019/0057625 A1* | 2/2019 | Quah | .................... | G09B 23/28 |
| 2020/0110427 A1* | 4/2020 | Berry | ..................... | G01F 1/363 |
| 2020/0150110 A1* | 5/2020 | Kerr | ................... | B29C 33/3842 |

* cited by examiner

700

```
┌─────────────────────────────────────┐
│ a system for simulating deposition  │
│ of substance in human lung is       │──710
│ provided                            │
└─────────────────────────────────────┘
                  │
                  ▼
┌─────────────────────────────────────┐
│ the system for simulating human lung│
│ for simulating human breathing is   │──720
│ operated                            │
└─────────────────────────────────────┘
                  │
                  ▼
┌─────────────────────────────────────┐
│    a deposition step is performed   │──730
└─────────────────────────────────────┘
                  │
                  ▼
┌─────────────────────────────────────┐
│    an observing step is performed   │──740
└─────────────────────────────────────┘
```

Fig. 13

Aerosol Density: ▦ High ▩ Medium ▢ Low ▨ Very Low

Fig. 15

Aerosol Density: ▨ High ▩ Medium ▢ Low ▨ Very Low

Aerosol Density: High  Medium  Low  Very Low

Fig. 22

IMITATING LUNG DEVICE, SYSTEM FOR SIMULATING HUMAN LUNG, METHOD FOR SIMULATING HUMAN BREATHING, SYSTEM FOR SIMULATING DEPOSITION OF SUBSTANCE IN HUMAN LUNG AND METHOD OF THE SAME

RELATED APPLICATIONS

This application claims priority to Taiwan Application Serial Number 107141097, filed Nov. 19, 2018, which is herein incorporated by reference.

BACKGROUND

Description of Related Art

The present disclosure relates to an imitating human organ and the application thereof. More particularly, the present disclosure relates to an imitating lung device, a system for simulating human lung, a method for simulating human breathing, a system for simulating deposition of substance in human lung and a method of the same.

DESCRIPTION OF RELATED ART

As the industry development and the decrease of the forest, air pollution is more seriously by days, and the ratio of the people suffered from the pulmonary disease is also increased. Taking PM2.5 for example, PM2.5 means the particle with diameter smaller than or equal to 2.5 (or 10) micrometer. When the aforementioned particles are inhaled by human body, it would deposit in the lung and then cause the inflammation of the partial area and result in chronic lung disease. The chronic lung diseases are classified into obstructive lung disease and restrictive lung disease. The obstructive lung disease is characterized by low exhalation caused by the obstructed airway and has the symptoms of shortness of breath and cough with sputum production. The obstructive disease includes chronic obstructive pulmonary disease (COPD) and asthma. The restrictive lung disease has the symptoms of difficult to breath and includes pneumonia and pulmonary fibrosis.

In order to treat the pulmonary diseases, doctors and scientists contribute to developing an effective administration method. The known method for pulmonary administration has the following advantages. First, the pulmonary administration is an efficient medicine delivery pathway due to a large area of lung area, and there is only one thin epithelium cell layer between the airway channel and blood vessels so as to make the medicine be absorbed easily. Second, the pulmonary administration is a non-invasive method for administration, and it is favorable for avoiding the risk of infection through a needle. Furthermore, compared with the oral administration, the medicine does not need to be metabolized by the metabolism of stomach and liver, and it is favorable for avoiding the pharmacodynamics effect from decreasing and from placing a burden on liver. Thus, the development of pulmonary administration has become the trend nowadays. However how to precisely deliver the medicine to the lesion region in lung so as to increase the efficiency of administration is the major challenge of the pulmonary administration. The current pulmonary administrations include using nebulizer, pressurized metered dose inhalers and dry powder inhaler. If the different methods of administration can be chosen according to the different types of pulmonary diseases, the medicine can be efficiently delivered to the lesion region in lung so that the medicine absorption can be enhanced and the pharmaceutical waste can be avoided.

However, the development of the medicine nowadays mainly relies on the animal experiment. The cost thereof is higher and the experimental animal may die during the experiment. Furthermore, because of the different species, the results of the animal experiments cannot be completely applied to human. In order to resolve the disadvantages of the animal experiment, models or devices for simulating the specific organ in vitro are developed so as to decrease the loss of experimental animal and to directly obtain the corresponding information related to human body. However, the device for simulating human lung used to observe the absorption and distribution of the medicine in human lung is to predict the results according to the size of the medicine particle, especially for the granular medicine, and the research about the nebulized aerosol is few. Furthermore, the design of the air channel of the aforementioned device has large difference to human lung, and the prediction thereof is performed without cooperating with the breathing mode of human. Not only the needed information to different administration methods cannot be comprehensively provided, but the actual deposition situation of the medicine in human lung cannot be truly reflected.

Accordingly, how to develop a new in vitro experimental device to decrease the animal experiment and to simulate human lung in real so as to effectively showing the actual deposition situation of substance in human lung, has become the goal of the related operators and researchers.

SUMMARY

According to one aspect of the present disclosure, an imitating lung device includes a first liquid accommodating layer, a first elastic membrane, an airway layer, a second elastic layer and a second liquid accommodating layer. The first liquid accommodating layer has an outer surface portion and an inner surface portion and includes a liquid inlet, a liquid outlet, a gas vent and a first liquid chamber. The liquid inlet, the liquid outlet and the gas vent are respectively disposed on the outer surface portion. The first liquid chamber is formed in the inner surface portion. The elastic membrane is disposed on the inner surface portion of the first liquid accommodating layer. The airway layer is disposed on one surface of the first elastic membrane away from the first liquid accommodating layer and includes a plurality of air channels and a plurality of imitating alveolar regions. The imitating alveolar regions are communicated with the air channels. The air channels are configured to simulate a branched structure of the 15th generation to the 19th generation of a human lung, and the imitating alveolar regions are configured to simulate a branched structure of the 20th generation to the 23th generation of a human lung. The second elastic layer is disposed on a surface of the airway layer away from the first elastic membrane. The second liquid accommodating layer is disposed on a surface of the second elastic membrane far from the airway layer, and a second liquid chamber is formed in an inner surface portion of the second liquid accommodating layer. Wherein the first elastic membrane directly covers the first liquid chamber and one side of the imitating alveolar regions, the second elastic membrane directly covers the second liquid chamber and the other side of the imitating alveolar regions. The deformable chambers are defined by the first elastic membrane, the imitating alveolar regions and the second elastic membrane. The liquid inlet, the liquid outlet, the first liquid chamber and the second liquid chamber are communicated with one another. The gas vent, the air channels and the deformable chambers are communicated with one another.

According to another aspect of the present disclosure, a system for simulating human lung is provided. The system for simulating human lung includes the imitating lung device according to the aforementioned aspect, a liquid-storage tank and a pump. The liquid-storage tank is communicated with the liquid inlet of the first liquid accommodating layer. The pump is connected with the liquid outlet of the first liquid accommodating layer and the liquid-storage tank respectively.

According to still another aspect of the present disclosure, a method for simulating human breathing includes steps as follows. The system for simulating human lung according to the aforementioned aspect is provided. A liquid filling step is performed, in which a liquid is filled into the first liquid chamber, the second liquid chamber and the liquid-storage tank, wherein the liquid is full in the first liquid chamber and the second liquid chamber and continuously flow from the liquid-storage tank into the first liquid chamber and the second liquid chamber via the liquid inlet. A simulating inhalation step is performed, in which the pump is turned on to extract the liquid of the first liquid chamber and the second liquid chamber to the liquid-storage tank so as to make a volume of the deformable chambers increase due to a decreased liquid-pressure and then make an outside gas flow into the deformable chambers via the gas vent. A simulating exhalation step is performed, in which the pump is turned off so as to make the volume of the deformable chambers decrease due to an increased liquid-pressure so as to let the gas in the deformable chambers exhaust from the gas vent.

According to yet another aspect of the present disclosure, a system for simulating deposition of substance in human lung includes a substance source for providing an observing-substance and the system for simulating human lung according to the aforementioned aspect. Wherein the substance source is communicated with the gas vent of the imitating lung device.

According to further another aspect of the present disclosure, a method for simulating deposition of substance in human lung includes steps as follows. The system for simulating deposition of substance in human lung according to the aforementioned aspect is provided. The system for simulating human lung is operated so as to simulate human breathing. A deposition step is performed, wherein the observing-substance of the substance source is transported into the imitating lung device via the gas vent. An observing step is performed, wherein the observing step is for observing a deposition situation of the observing-substance in the air channels and in the imitating alveolar regions.

BRIEF DESCRIPTION OF THE DRAWINGS

The present disclosure can be more fully understood by reading the following detailed description of the embodiment, with reference made to the accompanying drawings as follows:

FIG. 13 is a flow chart of a method for simulating deposition of substance in human lung according to still further another embodiment of the present disclosure.

FIG. 15 is a simulation result of the method for simulating deposition of substance in human lung in FIG. 13.

FIG. 16 is an integration result of FIG. 15.

FIG. 17 is a bar chart of FIG. 16.

FIG. 18 is another simulation result of the method for simulating deposition of substance in human lung in FIG. 13.

FIG. 19 is a bar chart of FIG. 18.

FIG. 20 is still another simulation result of the method for simulating deposition of substance in human lung in FIG. 13.

FIG. 21 is a bar chart of FIG. 20.

FIG. 22 is further another simulating result of the method for simulating deposition of substance in human lung in FIG. 13.

DETAILED DESCRIPTION

In the present disclosure, "the first" and "the second" are used for nomenclature but not for the quality or the other meanings. For example, "the first elastic membrane" represents the elastic membrane that disposed between the first liquid accommodating layer and the airway layer, and "the second elastic membrane" represents the elastic membrane that disposed between the second liquid accommodating layer and the airway layer. It is favorable for avoiding the use the term of "elastic membrane" from being unable to distinguish the arrangement position thereof.

Imitating Lung Device

Figure 1:
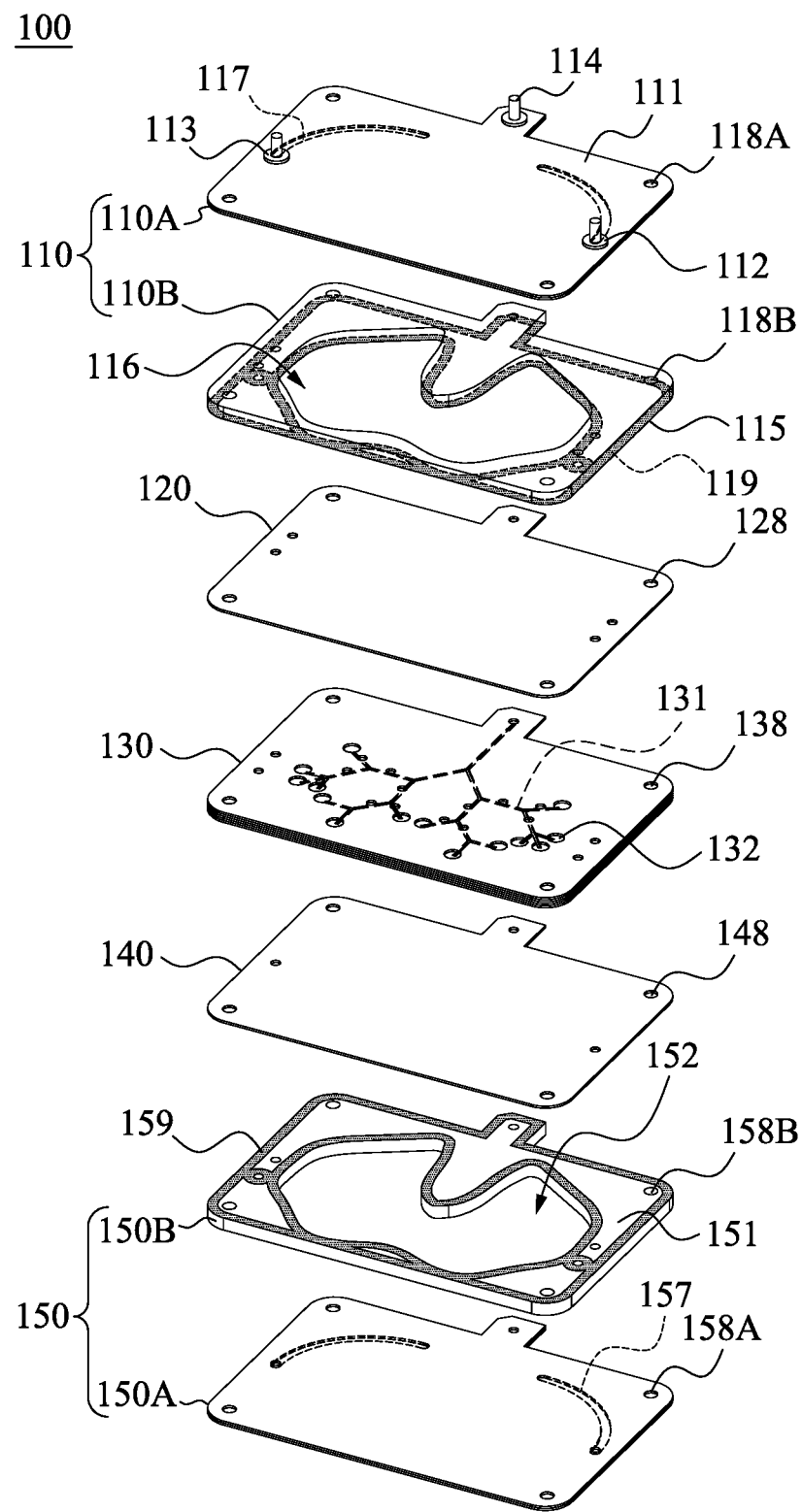
FIG. 1 is an exploded view of an imitating lung device according to one embodiment of the present disclosure.
Figure 2:
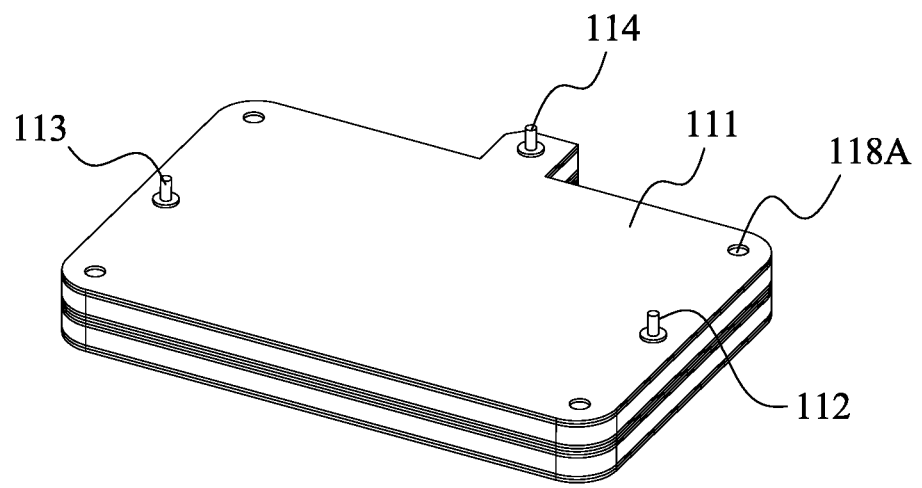
FIG. 2 is a three-dimensional view of the imitating lung device in FIG. 1.

Please refer to FIG. 1 and FIG. 2, FIG. 1 is an exploded view of an imitating lung device 100 according to one embodiment of the present disclosure, and FIG. 2 is a three-dimensional view of the imitating lung device 100 in FIG. 1. The imitating lung device 100 includes, in order from one side of the imitating lung device 100 to the other side thereof, a first liquid accommodating layer 110, a first elastic membrane 120, an airway layer 130, a second elastic membrane 140 and a second liquid accommodating layer 150.

The first liquid accommodating layer 110 has an outer surface portion 111 and an inner surface portion 115. A liquid inlet 112, a liquid outlet 113 and a gas vent 114 are respectively disposed on the outer surface portion 111, and a first liquid chamber 116 is formed in the inner surface portion 115.

The first elastic membrane 120 is disposed on the inner surface portion 115 of the first liquid accommodating layer 110. In particular, the first elastic membrane 120 is disposed between the first liquid accommodating layer 110 and the airway layer 130.

The airway layer 130 is disposed on a surface (reference number is omitted) of the first elastic membrane 120 which is away from the first liquid accommodating layer 110. In particular, the airway layer 130 is disposed between the first elastic membrane 120 and the second elastic membrane 140. The airway layer 130 includes a plurality of air channels 131 and a plurality of imitating alveolar regions 132. The imitating alveolar regions 132 are communicated with the air channels 131, the air channels 131 are configured to simulate a branched structure of the 15th generation to the 19th generation of a human lung, and the imitating alveolar regions 132 are configured to simulate a branched structure of the 20th generation to the 23th generation of a human lung. In detail, Weibel's lung model is the most widely used lung model currently and provides the data of the average length and diameter of branched structures of the human lung. According to the Weibel's lung model, the branched structures of the human lung are divided into 24 generations (from the 0th generation to the 23th generation), thus the air channels 131 of the present disclosure are configured to simulate the branched structure of the 15th generation to the 19th generation thereof, and the imitating alveolar regions 132 thereof are configured to simulate a branched structure of the 20th generation to the 23th generation thereof.

The second elastic membrane 140 is disposed on a surface (reference number is omitted) of the airway layer 130, which is far from the first elastic membrane 120. In particular, the second elastic membrane 140 is disposed between the airway layer 130 and the second liquid accommodating layer 150.

The second liquid accommodating layer 150 is disposed on a surface (reference number is omitted) of the second elastic membrane 140, which is away from the airway layer 130. A second liquid chamber 152 is formed in an inner surface portion 151 of the second liquid accommodating layer 150.

When the imitating lung device 100 is assembled completely, the first elastic membrane 120 directly covers the first liquid chamber 116 and one side of the imitating alveolar regions 132, the second elastic membrane 140 directly covers the second liquid chamber 152 and the other side of the imitating alveolar 132, and a plurality of deformable chambers (reference number is omitted) are defined by the first elastic membrane 120, the imitating alveolar regions 132 and the second elastic membrane 140. The liquid inlet 112, the liquid outlet 113, the first liquid chamber 116 and the second liquid chamber 152 are communicated with one another. The gas vent 114, the air channels 131 and the deformable chambers are communicated with one another.

By the aforementioned structure, the air channels 131 have a branched structure similar to that of the 15th generation to the 19th generation of the human lung. Furthermore, the deformable chambers are given a respiration function (please refer the detail as follows) by the regulation of the liquid pressure of the first liquid chamber 116 and the second liquid chamber 152 so as to simulate human respiration mode. Accordingly, the imitating lung device 100 of the present disclosure can be applied as an in vitro test device for simulating lung. Therefore, the animal experiments can be decreased tests, and the corresponding information related to human body can be obtained so as to improve the reliability of the aforementioned information.

The more detailed description for the imitating lung device 100 is as follows.

In FIG. 1, the first liquid accommodating layer 110 includes an outer layer 110A and an inner layer 110B, and the outer layer 110A and the inner layer 110B are disposed separately. However, the present disclosure is not limited thereto. In other embodiments (not shown), the outer layer 110A and the inner layer 110B of the first liquid accommodating layer 110 can be disposed integrally. When the outer layer 110A and the inner layer 110B are assembled together, the first liquid chamber 116 can be considered as formed by the inwardly depressed of the inner surface portion 115. Furthermore, the outer layer 110A can further include two passageways 117 in the inner part thereof. One of the passageways 117 is communicated with the liquid inlet 112 and the first liquid chamber 116, and the other passageway 117 is communicated with the liquid outlet 113 and the first liquid chamber 116.

Figure 3:
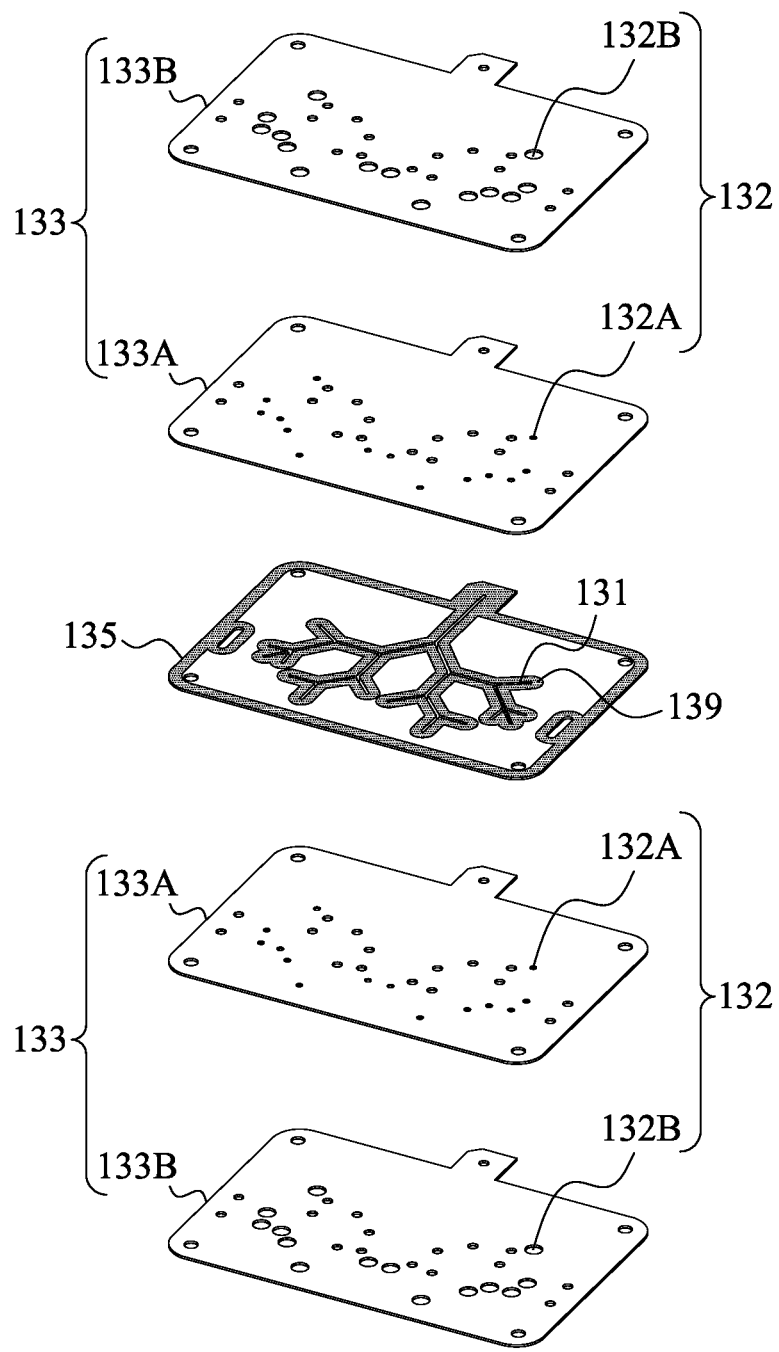
FIG. 3 is an exploded view of an airway layer in FIG. 1.

Please refer to FIG. 3, which is an exploded view of the airway layer 130 in FIG. 1. In FIG. 3, the airway layer 130 is a five-layered structure and includes, in order from one side of the airway layer to the other side thereof, a second imitating alveolar region layer 133B, a first imitating alveolar region layer 133A, an air channel layer 135, another first imitating alveolar region layer 133A and another second imitating alveolar region layer 133B, wherein the air channel layer 135 includes the air channels 131, the first imitating alveolar region layer 133A includes through holes 132A, the second imitating alveolar region layer 133B includes through holes 132B, and the first imitating alveolar region layer 133A and the second imitating alveolar region layer 133B are combined so as to form the imitating alveolar region layer 133. At this time, the through holes 132A and the through holes 132B are combined so as to form the imitating alveolar region 132. In the present embodiment, the airway layer 130 is a five-layered structure, but the present disclosure is not limited thereto, and the airway layer 130 can be formed by the air channels 131 and the imitating alveolar regions 132 with a structure having different numbers of layer or by other ways.

Please refer to Table 1, which shows the size of the air channels 131 of the present disclosure and the diameter of the branched structure of the 15th generation to the 19th generation of the human lung recorded in the literature. Because it is difficult to form the air channels 131 being cylindrical, the air channels 131 in FIG. 1 are arranged with rectangular cross-sections, wherein the edge length (the width and height in Table 1) of the rectangle is obtained from converting the diameters in the literature by the hydraulic diameter formula. Accordingly, the air channels 131 of the present disclosure has a structure similar to the branched structure of the 15th generation to the 19th generation of the human lung, and the volume of the air channels 131 is similar to the data recorded in the literature. However, the present disclosure is not limited thereto, and the size as well as the shape of the air channels 131 can be flexibly adjustable to simulate the branched structure of the 15th generation to the 19th generation of the human lung more appropriately. Furthermore, in the imitating lung device 100 of FIG. 1, the branched structure of the 20th generation to the 23th generation is simplified to the imitating alveolar regions 132, and the diameter of the imitating alveolar regions 132 is 4 mm. The imitating alveolar regions 132 focus on functionally simulating the branched structure of the 20th generation to the 23th generation, and the deformable chamber formed by the imitating alveolar regions 132, the first elastic membrane 120 and the second elastic membrane 140 can simulate the respiration function of human alveolar (the detail please refer to the follows).

TABLE 1

| Generation | Size of air channel 131 | | | Literature data |
| --- | --- | --- | --- | --- |
| | Width (mm) | Height (mm) | Length (mm) | Diameter (mm) |
| 15 | 0.97 | 0.5 | 21 | 0.66 |
| 16 | 0.77 | 0.5 | 13 | 0.56 |
| 17 | 0.61 | 0.5 | 11.1 | 0.48 |
| 18 | 0.48 | 0.5 | 9.4 | 0.41 |
| 19 | 0.38 | 0.5 | 8 | 0.34 |

In FIG. 1, the second liquid accommodating layer 150 includes an outer layer 150A and an inner layer 150B, wherein the outer layer 150A and the inner layer 150B are disposed separately. However, the present disclosure is not limited thereto. In other embodiments (not shown), the outer layer 150A and the inner layer 150B of the second liquid accommodating layer 150 can be disposed integrally. When the outer layer 150A and the inner layer 150B are assembled together, the second liquid chamber 152 can be considered as formed by the inwardly depressed of the inner surface portion 151. Furthermore, the outer layer 150A can further include two passageways 157 in the inner part thereof. One of the passageways 157 is communicated with the liquid inlet 112 and the second liquid chamber 152, and the other passageway 157 is communicated with the liquid outlet 113 and the second liquid chamber 152.

In FIG. 1, the first liquid accommodating layer 110, the first elastic membrane 120, the airway layer 130, the second elastic membrane 140 and the second liquid accommodating layer 150 can be made of a transparent material. Therefore, it is favorable for directly observing the deposition of the substance in the imitating lung device 100 without opening the imitating lung device 100. The material of the first liquid accommodating layer 110, the airway layer 130 and the second liquid accommodating layer 150 can be, but not limited to, polymethylmethacrylate (PMMA), polyethylene terephthalate (PET) or polycarbonate (PC). The materials of the first liquid accommodating layer 110, the airway layer 130 and the second liquid accommodating layer 150 can be the same or different. The materials of the first elastic membrane 120 and the second elastic membrane 140 can be, but not limited to, polydimethylsiloxane (PMDS). Furthermore, materials which can provide the elasticity for the deformation of the deformable chamber can also be used as the material of the first elastic membrane 120 and the second elastic membrane 140. The materials of the first elastic membrane 120 and the second elastic membrane 140 can be the same or be different. Preferably, the first liquid accommodating layer 110, the first elastic membrane 120, the airway layer 130, the second elastic membrane 140 and the second liquid accommodating layer 150 can be made of non-toxic materials. Therefore, it is favorable for incubating the lung epithelial cells in the air channels 131 and the imitating alveolar regions 132 so as to carry on further researches. Furthermore, according to one embodiment of the present disclosure, the thickness of the first elastic membrane 120 and the second elastic membrane 140 can be, but not limited to, 70 μm to 90 μm.

In FIG. 1, the outer layer 110A of the first liquid accommodating layer 110 includes four positioning parts 118A (only one positioning part 118A is marked in FIG. 1) disposed in the four corners of the outer layer 110A, respectively. The inner layer 110B of the first liquid accommodating layer 110 includes four positioning parts 118B (only one positioning part 118B is marked in FIG. 1) disposed in the four corners of the inner layer 110B, respectively. The first elastic membrane 120 includes four positioning parts 128 (only one positioning part 128 is marked in FIG. 1) disposed in the four corners of the first elastic membrane 120, respectively. The airway layer 130 includes four positioning parts 138 (only one positioning part 138 is marked in FIG. 1) disposed in the four corners of the airway layer 130, respectively. The second elastic membrane 140 includes four positioning parts 148 (only one positioning part 148 is marked in FIG. 1) disposed in the four corners of the second elastic membrane 140, respectively. The second liquid accommodating layer 150 includes four positioning parts 158A and four positioning parts 158B (only one positioning part 158A and one positioning part 158B are marked in FIG. 1), wherein the four positioning parts 158A are respectively disposed in the four corners of the outer layer 150A of the second liquid accommodating layer 150, the four positioning parts 158B are respectively disposed in the four corners of the inner layer 150B of the second liquid accommodating layer 150, and the positioning part 118A, the positioning part 118B, the positioning part 128, the positioning part 138, the positioning part 148 and the positioning part 158 are corresponded to one another. Accordingly, it is favorable for the alignment of the imitating lung device 100 during the assembled process thereof so as to improve the assembly efficiency thereof. For example, the positioning part 118A, the positioning part 118B, the positioning part 128, the positioning part 138, the positioning part 148 and the positioning part 158 are respectively through-hole structures, and the positioning part 118A, the positioning part 118B, the positioning part 128, the positioning part 138, the positioning part 148 and the positioning part 158 can be assembled by four thin rods so as to achieve the efficacy of positioning and alignment. Furthermore, one side of each of the positioning part 118A, the positioning part 118B, the positioning part 128, the positioning part 138, the positioning part 148 and the positioning part 158 can be arranged as a concave structure, the other side of each of the positioning part 118A, the positioning part 118B, the positioning part 128, the positioning part 138, the positioning part 148 and the positioning part 158 can be arranged as a convex structure, and the concave structure and the convex structure can be cooperated with each other. For example, the one side of the positioning part 118A, which is on the outer surface portion 111 of the outer layer 110A, is a concave structure, and the other side, which is on the inner surface portion 115 of the outer layer 110A, is a convex structure; the one side of the positioning part 118B, which is in the outer surface portion 111 of the outer layer 110B, is a concave structure, and the other side, which is in the inner surface portion 115 of the outer layer 110B, is a convex structure, and the convex structure of the positioning part 118A is cooperated with the concave structure of the positioning part 118B, the configuration of each of the other of the positioning part 128, the positioning part 138, the positioning part 148 and the positioning part 158 is in the same manner so as to achieve the efficacy of positioning and alignment. Moreover, how to make the positioning part 118A, the positioning part 118b, the positioning part 128, the positioning part 138, the positioning part 148 and the positioning part 158 cooperate with one another to help the alignment and the positioning of each layer is known in the art, it is not listed one by one herein.

In FIG. 1, the imitating lung device 100 is a screwless structure, and the first liquid accommodating layer 110, the first elastic membrane 120, the airway layer 130, the second elastic membrane 140 and the second liquid accommodating layer 150 can be combined by adhesives (that are adhesive 119 and adhesive 159). Accordingly, the components can be simplified and the assembly efficacy can be improved. Furthermore, the imitating lung device 100 can be arranged as a detachable structure by controlling the coating amount of the adhesive, and the adhesive can be, but not limited to, the adhesive with model 9122 of 3M Company.

The following examples are performed by the inner surface portion 115 of the first liquid accommodating layer 110 and the inner surface portion 151 of the second liquid accommodating layer 150 of FIG. 1 so as to explain how to control the coating amount of the adhesive and then make the imitating lung device 100 a detachable structure. Furthermore, because the other layers thereof are not the major content of the present example, the adhesive coating situation of other layers is not shown. In FIG. 1, the inner surface portion 115 of the first liquid accommodating layer 110 is coated with the adhesive 119, the inner surface portion 151 of the second liquid accommodating layer 150 is coated with the adhesive 159, and the width of the adhesive 119 and the adhesive 159 can be, but not limited to, 1.6 mm to 2.3 mm. By partially coating the adhesive 119 on the inner surface portion 115 of the first liquid accommodating layer 110, the first liquid accommodating layer 110 and the first elastic membrane 120 are detachably connected, and by partially coating the adhesive 159 on the inner surface portion 159 of the second liquid accommodating layer 150, the second liquid accommodating layer 150 and the second elastic membrane 140 are detachably connected. Because the first elastic membrane 120 and the second elastic membrane 140 may occur elastic fatigue after used with many times and need to be exchanged, partial coating of the adhesive 119 and the adhesive 159 is beneficial to exchange the first elastic membrane 120 and the second elastic membrane 140, making the first liquid accommodating layer 110 and the second liquid accommodating layer 150 capable to reuse.

The following example are performed by the air channel layer 135 of FIG. 3 so as to explain how to control the coating amount of the adhesive and then make the imitating lung device 100 a detachable structure. Furthermore, because the other layers thereof are not the content of the present example, the adhesive coating situation of other layers is not shown. In FIG. 3, the two surfaces of the air channel layer 135 are coated with the adhesive 139 (only one surface is shown in FIG. 3). By partially coating of the adhesive 139 on the air channel layer 135, the first imitating alveolar region layer 133A and the air channel layer 135 are detachably connected, the width of the adhesive 139 can be, but not limited to, 1.6 mm to 2.3 mm. By partial coating of the adhesive 139, after the test, the substance in the air channels 131 and in the imitating alveolar regions 132 can be directly collected to do analysis or to scan with probe, being advantage to directly observe the distribution situation of the substance in the air channels 131 and the imitating alveolar regions 132.

Furthermore, according to the actual demands, a grease can be applied to the region which is uncoated with the adhesive 119, the adhesive 139 and the adhesive 159 so as to enhance the adhesion between the first liquid accommodating layer 110 and the first elastic membrane 120, between the first imitating alveolar region layer 133A and the air channel layer 135, between the second liquid accommodating layer 150 and the second elastic membrane 140. It is favorable for avoiding the situation of air leak due to the smaller region of the adhesive coating. However, the aforementioned coating method of the adhesive is only the example, the present disclosure is not limited herein, if the imitating lung device 100 is not necessary to be disassembled, the coating region of the adhesive can be extended, or the coating region of the adhesive can be adjusted according the stickiness of the adhesive.

System for Simulating Human Lung

Figure 4:
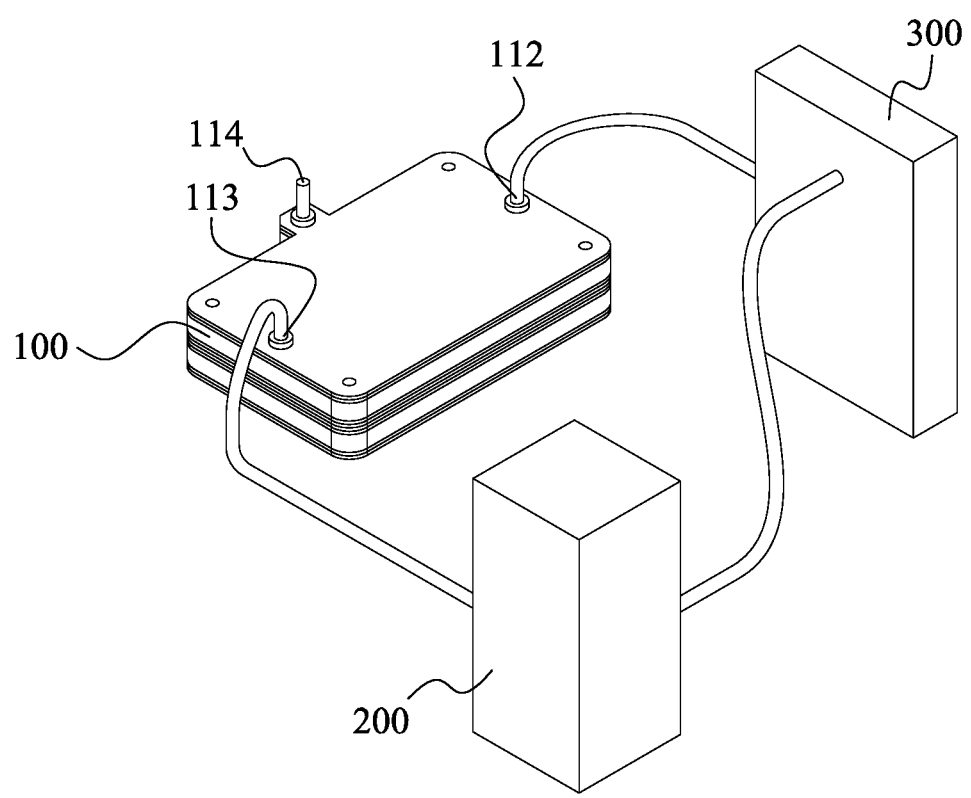
FIG. 4 is a connection view of a system for simulating human lung according to another embodiment of the present disclosure.

FIG. 4 is a connection view of a system for simulating human lung (reference number is not shown) according to another embodiment of the present disclosure. In FIG. 4, the system for simulating human lung includes the imitating lung device 100, a pump 200 and a liquid-storage tank 300. The detail about the imitating lung device 100 please refers to the aforementioned description, the liquid-storage tank 300 is communicated with the liquid inlet 112 of the first liquid accommodating layer 110, and the pump 200 is respectively connected with the liquid outlet 113 of the first liquid accommodating layer 110 and the liquid-storage tank 300. Accordingly, a circulating pathway of the liquid can be formed. The liquid (not shown in Figure) can flow into the first liquid chamber 116 and the second liquid chamber 152 of the imitating lung device 100 via the liquid inlet 112 from the liquid-storage tank 300 and then be further extracted from the liquid outlet 113 by the pump 200 so as to deliver back to the liquid-storage tank 300. The pump 200 can be, but not limited to, a peristaltic pump. Therefore, it is favorable for using continuously.

Method for Simulating Human Breathing

Figure 5:
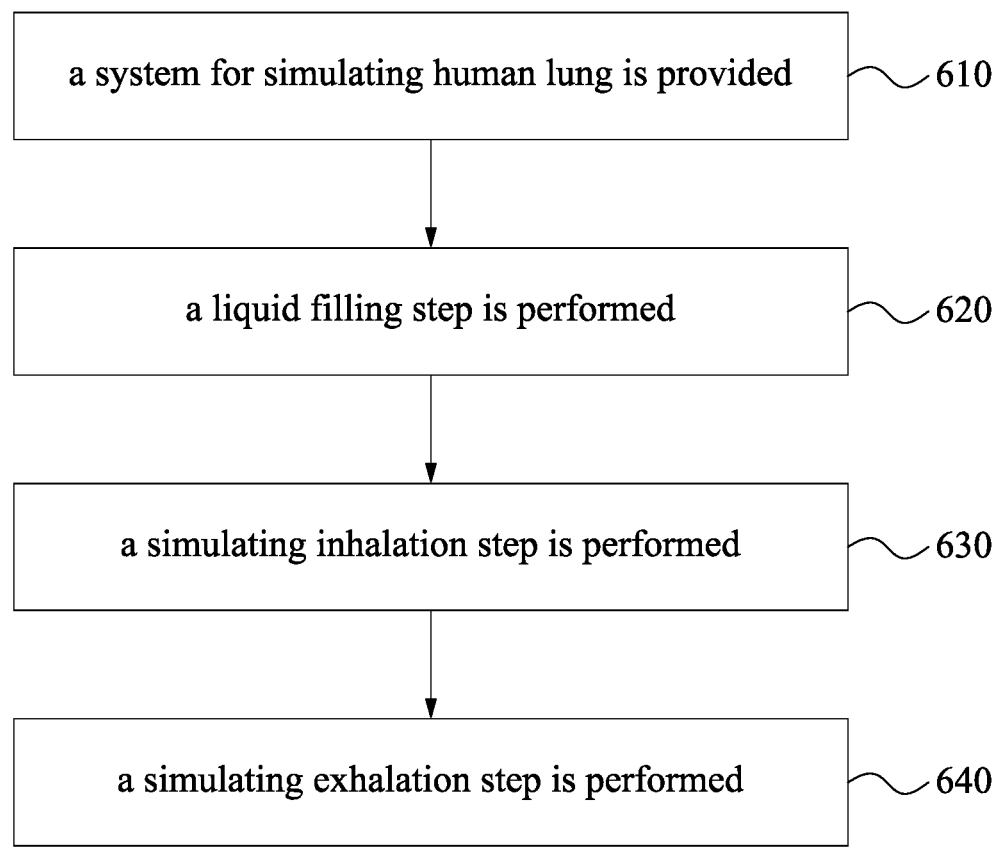
FIG. 5 is a flow chart of a method for simulating human breathing according to still another embodiment of the present disclosure.

FIG. 5 is a flow chart of a method 600 for simulating human breathing according to still another embodiment of the present disclosure. An explanation is provided in cooperation with the system for simulating human lung in FIG. 4 as follows. The method 600 for simulating human breathing includes Step 610, Step 620, Step 630 and Step 640.

In Step 610, a system for simulating human lung is provided, and the detail about the system for simulating human lung can refer to FIG. 4.

In Step 620, a liquid filling step is performed, in which a liquid is filled into the first liquid chamber 116, the second liquid chamber 152 and the liquid-storage tank 300, wherein the liquid is full in the first liquid chamber 116 and the second liquid chamber 152 (which means that there is no air in the first liquid chamber 116 and the second liquid chamber 152) and continuously flow from the liquid-storage tank 300 into the first liquid chamber 116 and the second liquid chamber 152 via the liquid inlet 112. The aforementioned term "continuously" means the status that the liquid in the liquid-storage tank 300 keeps flowing into the first liquid chamber 116 and the second liquid chamber 152 during performing the step 630 and the step 640.

In Step 630, a simulating inhalation step is performed, in which the pump is turned on to extract the liquid of the first liquid chamber 116 and the second liquid chamber 152 into the liquid-storage tank 300, so that the volume of the deformable chamber becomes larger due to the decreased liquid-pressure and then make an outside gas flow into the deformable chambers via the gas vent 114. The aforementioned liquid-pressure means the pressure that the liquid in the first liquid chamber 116 and the second liquid chamber 152 gives to the deformable chamber. In other words, in Step 630, the extraction speed of the pump 200 to the liquid must be bigger than the flow rate of the liquid flowing into from the liquid-storage tank 300 so as to make the liquid pressure decrease and then achieve simulating human inhalation.

In Step 640, a simulating exhalation step is performed, in which the pump 200 is turned off so as to make the volume of the deformable chambers decrease due to an increased liquid-pressure so as to let the gas in the deformable chambers exhaust from the gas vent 114. In particular, because the pump 200 turns off, the liquid of the first liquid chamber 116 and the second liquid chamber 152 cannot be extracted to the liquid-storage tank 300, but the liquid in the liquid-storage tank 300 keeps flowing into the first liquid chamber 116 and the second liquid chamber 152. Thus, the liquid pressure will increase so as to achieve the simulation of human exhalation.

Step 630 and Step 640 can be repeated, thereby setting up a circulating respiration mode.

In the method 600 for simulating human breathing, the air channels 131 of the imitating lung device 100 have a similar structure to the human lung. The liquid pressure of the first liquid chamber 116 and the second liquid chamber 152 can be regulated by the operation of the pump 200 and the liquid-storage tank 300 and give the deformable chamber a breathing function so as to simulate human breathing mode. Therefore, the method 600 for simulating human breathing can effectively simulate human lung and make the obtained corresponding information related with human body higher reliability.

Figure 6:
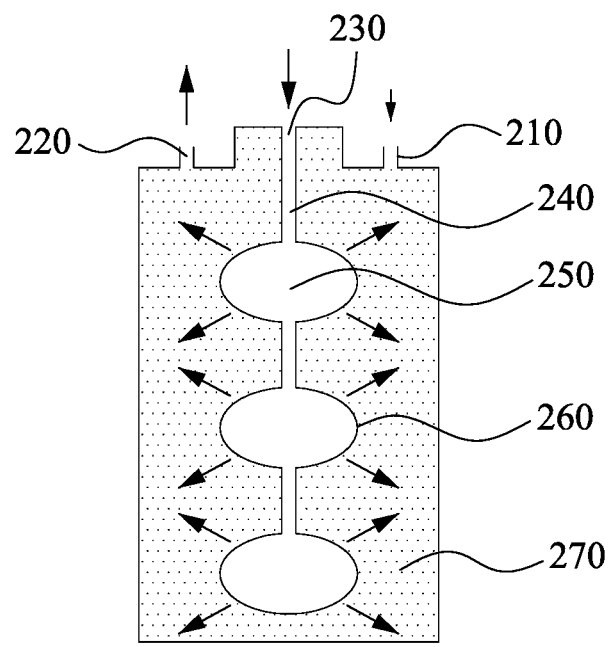
FIG. 6 is an acting view of the inhale simulating step in FIG. 5.
Figure 7:
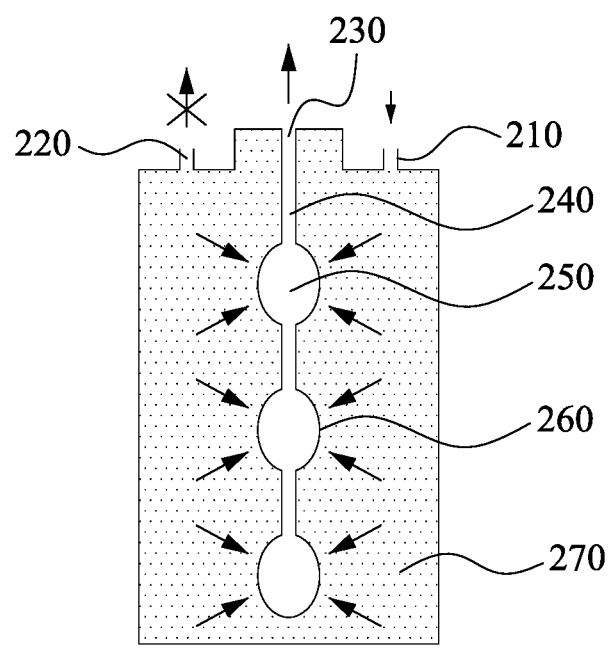
FIG. 7 is an acting view of the exhale simulating step in FIG. 5.

The simulating inhalation step and the simulating exhalation step in FIG. 5 are explained in more detail by FIG. 6 and FIG. 7 as follows, wherein FIG. 6 is an acting view of the inhale simulating step in FIG. 5 and FIG. 7 is an acting view of the exhale simulating step in FIG. 5. Because FIG. 6 and FIG. 7 are used to explain how to give the deformable chamber 250 a respiration function by regulating the liquid pressure, the arrangements of each element in FIG. 6 and in FIG. 7 are not in accordance with the position of the imitating lung device 100 in FIG. 1 but mainly for clearly observing the action of the simulating inhalation step and the simulating exhalation step, and the elements of the imitating lung device 290 in FIG. 6 and FIG. 7 are renumbered. In other words, as long as the same action can be achieved, the arrangement of each element of the imitating lung device 100 in FIG. 1 can be flexible adjusted. In FIG. 6, when the inhalation simulating step is performed, the pump (not shown in figure) is turned on to extract the liquid 270 in the first liquid chamber (reference number is omitted) and the second liquid chamber (reference number is omitted) from the liquid outlet 220, wherein the arrow above the liquid outlet 220 represents the flowing direction of the liquid 270. At this time, the liquid 270 in the liquid-storage tank (not shown in figure) keeps flowing into the first liquid chamber and the second liquid chamber through the liquid inlet 210, wherein the arrow above the liquid inlet 210 represents the flowing direction of the liquid 270. Because the speed that the pump extracts the liquid 270 is bigger than that of the liquid 270 flows into from the liquid-storage tank so as to make the liquid pressure of the deformable chamber 250 decrease, the elastic membrane 260 (such as the first elastic membrane 120 and the second elastic membrane 140 in FIG. 1) is deformed so as to make the volume increase (the arrows surrounding to the deformable chamber 250 represent the deformed direction of the elastic membrane 260). Therefore, the air pressure of the deformable chamber 250 can be changed so as to make the outside air flow into the deformable chamber 250 from the air inlet 230 via the air channel 240 and produce the effect of simulating human inhalation (the arrow above the air inlet 230 represents the airflow direction).

In FIG. 7, when the imitating exhalation step is performed, the pump (not shown) turns off, the liquid 270 would be stopped to extract from the liquid outlet 220 (the mark above the liquid outlet 220 represents there is no outflow of the liquid), the liquid in the liquid-storage tank (not shown) keeps flowing into the first liquid chamber (reference number not shown) and the second liquid chamber (reference number not shown), resulting that the liquid pressure of the deformable chamber 250 becomes large. Accordingly, the elastic membrane 260 (which is the first elastic membrane and the second elastic membrane) is deformed so as to compress the volume of the deformable chamber 250. Therefore, the air pressure of the deformable chamber 250 can be changed so as to make the gas in the deformable chamber 250 exhaust from air outlet 230 through the air channel 240 and then produce the effect of simulating human exhalation.

Please refer to FIG. 4 and FIG. 5, in the inhalation simulating step, the starting time of the pump can be 2 seconds, and in the simulating exhalation step, the closing time of the pump can be 2 seconds. The breathing frequency of normal people is 12 times to 18 times per minute; thereby a circulating respiration mode can be set up in 15 times per minute, which is the average frequency of normal human breathing per minute.

Please refer to FIG. 4 and FIG. 5, the liquid can be water. The flow rate of the liquid extracted by the pump can be 0.05 mL/min to 50 mL/min, there has a pressure drop between the liquid-storage tank 300 and the liquid inlet 112, and the pressure drop is more than 0 kPa and less than or equal to 25 kPa. Accordingly, it is favorable for regulating the liquid pressure to effectively simulate human breathing. The pressure drop can be produced by a PEEK tubing (not shown) disposed between the liquid-storage tank 300 and the liquid inlet 112, and the pressure drop is regulated by using the PEEK tube with different length and inside diameter.

Test Result of Method for Simulating Human Breathing

The system for simulating human lung in FIG. 4 is used, the flow rate that the pump 200 extracts the liquid is 80 rpm, respectively cooperating with a pressure drop of 0.35 kPa (using a PEEK tubing with length (L)=2 cm, inside diameter (ID)=1 mm), 11.18 kPa (using a PEEK tubing with L=20 cm, ID=0.75 mm) and 22.63 kPa (using a PEEK tubing with L=0.5 cm, ID=0.25 mm). The maximum tidal breathing volume of the imitating lung device 100 is measured under different condition, and the maximum tidal breathing volume means the difference between the maximum exhaled volume and the maximum inhaled volume. The aforementioned three conditions respectively simulate a lung suffered from a restrictive lung disease ("restrictive lung" hereafter), a normal lung, and a lung suffered from an obstructive lung disease ("obstructive lung" hereafter). The flow rate of the imitating lung device 100 is measured under different conditions and is converted into Reynolds number. Table 2 shows the measurement results of the Reynolds number (Re) under the aforementioned three conditions.

TABLE 2

| Generation | Normal lung | Obstructive lung | Restrictive lung |
|---|---|---|---|
| 15 | 1.103 | 0.861 | 0.414 |
| 16 | 0.589 | 0.460 | 0.221 |
| 17 | 0.319 | 0.249 | 0.120 |
| 18 | 0.173 | 0.135 | 0.065 |
| 19 | 0.145 | 0.113 | 0.054 |

The Reynolds number in Table 2 is consistent with the results recorded in the literature, showing that the method for simulating human breathing of the present disclosure can effectively simulate human breathing.

Figure 8:
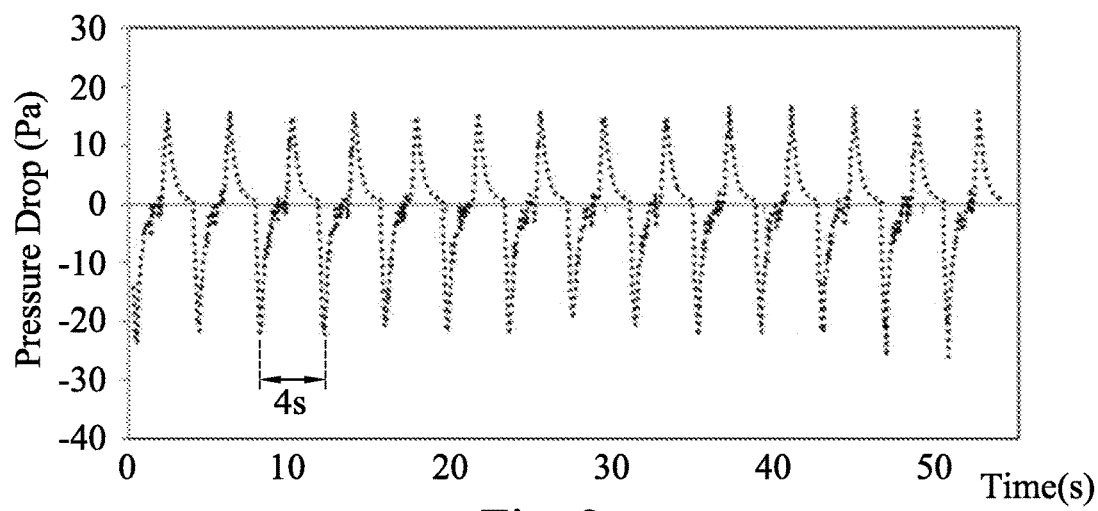
FIG. 8 is a simulation result of the method for simulating human breathing in FIG. 5.
Figure 9:
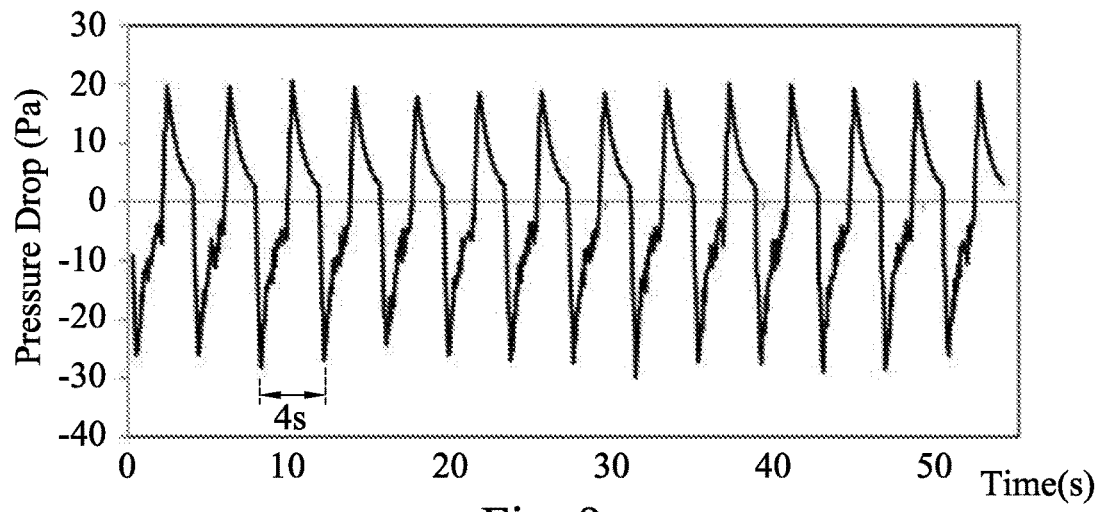
FIG. 9 is another simulation result of the method for simulating human breathing in FIG. 5.
Figure 10:
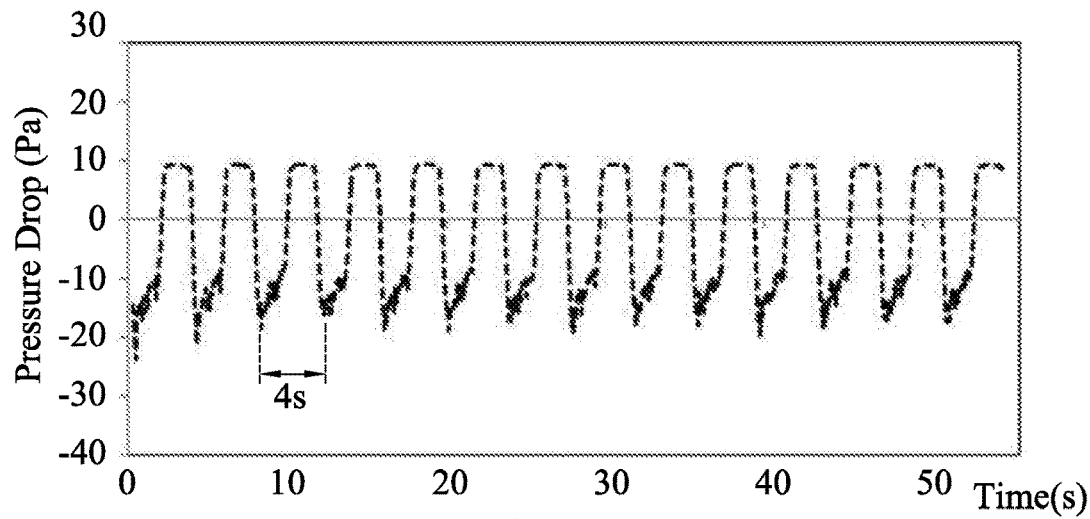
FIG. 10 is still another simulating result of the method for simulating human breathing in FIG. 5.

Then, the relationship between the pressure drop of the gas vent 114 of the imitating lung device 100 and the time is measured under different conditions by using the system for simulating human lung in FIG. 4 under the same as the aforementioned conditions. The pressure drop of the gas vent 114 is measured by a pressure sensor (SDP610, Sensirion) disposed at the gas vent 114, and the result is transported to record in a computer. Please refer to FIG. 8 to FIG. 10, FIG. 8 is an simulation result of the method for simulating human breathing in FIG. 5, FIG. 9 is another simulation result of the method for simulating human breathing in FIG. 5, and FIG. 10 is still another simulation result of the method for simulating human breathing in FIG. 5. In particular, FIG. 8 to FIG. 10 respectively shows the relationships between the pressure drops of the gas vent 114 of the restrictive lung, the normal lung, and the obstructive lung and the time, wherein the wave crest represents the maximum exhaled volume and the wave trough represents the maximum inhaled volume. Comparing FIG. 8 with FIG. 9, the change of the tidal breathing volume in FIG. 8 is smaller, that means the amplitudes of the crest and trough thereof are smaller than those in FIG. 9. It indicates that the inhalation and the exhalation are restricted and identical to the symptom of the restrictive lung disease. Comparing FIG. 9 with FIG. 10, the exhaled volume in FIG. 10 is smaller, which is identical to the obstructive lung disease. According to the results in FIG. 8 to FIG. 10, the present disclosure successfully simulates the different types of the lung, when it is applied to the research of the inhaled type of the medicine, the different administration can be chosen according to the different types of pulmonary disease, efficiently delivering the medicine to the lesion area in lung, capable to enhancing the absorption of the medicine and avoid the waste of the medicine.

System for Simulating Deposition of Substance in Human Lung

A system for simulating deposition of substance in human lung is provided in the present disclosure. The system for simulating deposition of substance in human lung includes a substance source and a system for simulating human lung. The detail about the system for simulating human lung can be referred to FIG. 4, wherein the substance source provides an observing-substance and is communicated with the gas vent 114 of the imitating lung device 100. Accordingly, the absorption and distribution situation of the observing-substance which is in human lung can be observed and is favorable for applying to diversified application. For example, the substance source can be a polluted air, and the observing-substance can be a pollutant in the polluted air. In actually, the system for imitating human lung can be put in the environment in which air is polluted, and the system for simulating human lung is operated to simulate human breathing. When the system for simulating human lung simulates inhalation and exhalation, the pollutants in the polluted air go into the imitating lung device 100. Thus, the deposition situation of the observing-substance which is in the air channels 131 and the imitating alveolar regions 132 can be observed, it is favorable to the research and the analysis of the pollutants in the polluted air. Or, the substance source is a burning cigarette, and the observing-substance can be smoke which can pass through the filter, thus it is favorable to research the components of the smoke passing through the filter so as to beneficial to the improvement of the filter.

Figure 11:
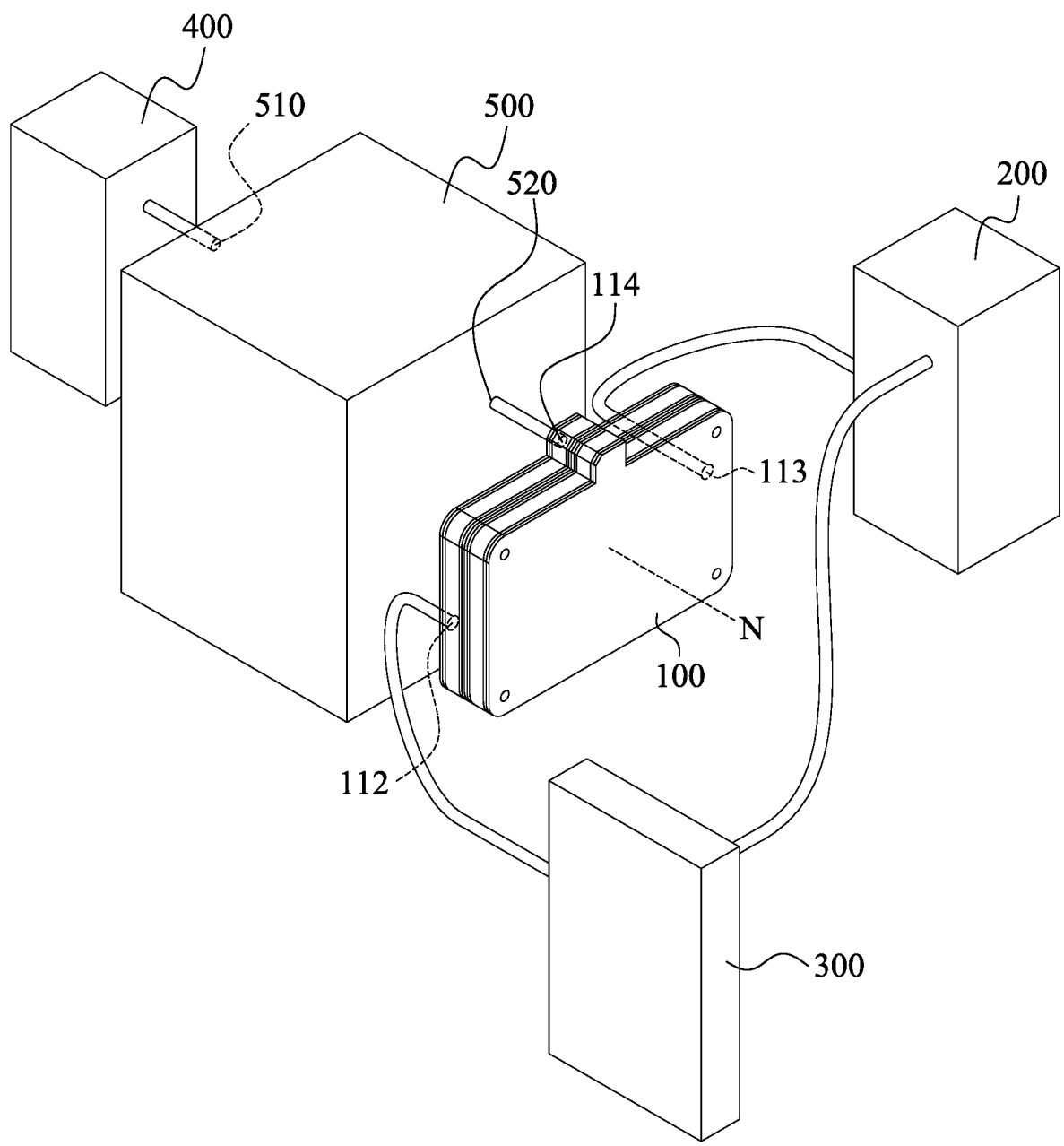
FIG. 11 is a connection view of a system for simulating deposition of substance in human lung according to yet another embodiment of the present disclosure.

FIG. 11 is a connection view of a system for simulating deposition of substance in human lung (reference number is omitted) according to yet another embodiment of the present disclosure. In FIG. 11, the system for simulating deposition of substance in human lung includes a substance source 400, an exposure chamber 500 and a system for simulating human lung (reference number not shown), the system for simulating human lung includes the imitating lung device 100, the pump 200 and the liquid-storage tank 300. The substance source 400 provides a observing-substance (not shown), the exposure chamber 500 includes two openings, which are the opening 510 and the opening 520, wherein the opening 510 and the opening 520 are disposed at the opposite sides (reference number is omitted) of the exposure chamber 500, the openings 510 of the exposure chamber 500 is connected with the substance source 400, and the opening 520 of the exposure chamber 500 is connected with the gas vent 114 of the imitating lung device 100. Thus, the observing-substance which is provided by the substance source 400 can go into the exposure chamber 500, and then pass through the gas vent 114 into the imitating lung device 100. The substance source 400 can be a nebulizer, and the observing-substance can be an atomized aerosol, accordingly, compared with the conventional imitating lung device for mainly researching the dry powder type of the medicine, the present disclosure can be applied on the research of the medicine in aerosol form. In other words, the observing-substance which is provided by the substance source 400 can be a medicine, and the medicine can be a dry powder form or an aerosol form atomized by a nebulizer. When the system for simulating deposition of substance in human lung of the present disclosure is applied for the inhaled type of the medicine, the experimental parameters are cooperated to adjust so as to make the system for simulating human lung simulate different types of lung (restrictive lung, normal lung and obstructive lung), understanding the mechanism of medicine delivery in different types of pulmonary diseases, beneficial to choose different administration method based on the different types of pulmonary diseases for efficiently delivering the medicine to the lesion area of lung. Additionally, the observing-substance of the present disclosure can be a fluorescent aerosol, which is convenient for observation by adding the fluorescent ingredient to the aerosol. In FIG. 11, the imitating lung device 100 is vertically disposed. The vertical disposition means that the normal vector N of the imitating lung device 100 is parallel with the level surface (not shown). Accordingly, when it applied for the research of the inhaled type of the medicine, the disposition direction of the imitating lung device 100 can simulate that the patient inhales the medicine in a sitting position.

Figure 12:
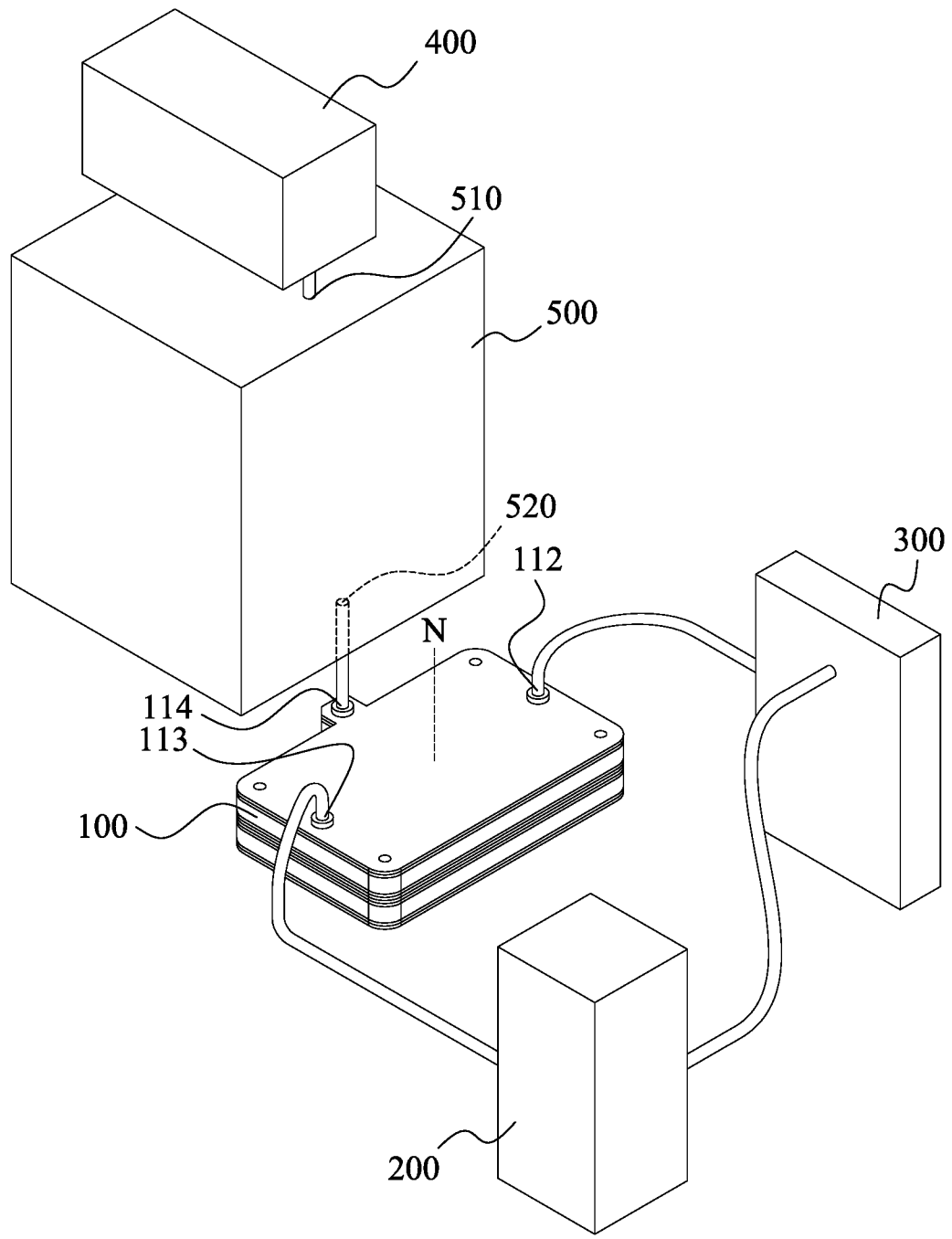
FIG. 12 is a connection view of a system for simulating deposition of substance in human lung according to further another embodiment of the present disclosure.

FIG. 12 is a connection view of a system for simulating deposition of substance in human lung (reference number not shown) according to further another embodiment of the present disclosure. In FIG. 12, the system for simulating deposition of substance in human lung includes the substance source 400, the exposure chamber 500 and the system for simulating human lung. The system for simulating human lung includes the imitating lung device 100, the pump 200 and liquid-storage tank 300. In FIG. 12, the imitating lung device 100 is horizontally disposed. The horizontal disposition means that the normal vector N of the imitating lung device 100 is vertical with the level surface (not shown). Accordingly, when it applied for the research of the inhaled type of the medicine, the disposition direction of the imitating lung device 100 can simulate that the patient inhales the medicine in a lying position. About the other details of FIG. 12 can be referred to the description of FIG. 11, it does not describe again herein.

Method for Simulating Deposition of Substance in Human Lung

FIG. 13 is a flow chart of a method 700 for simulating deposition of substance in human lung according to still further another embodiment of the present disclosure. In FIG. 13, the method 700 for simulating deposition of substance in human lung includes Step 710, Step 720, Step 730 and Step 740.

In Step 710, a system for simulating deposition of substance in human lung is provided, and the details of the system for simulating deposition of substance in human lung can be referred to FIG. 11 and FIG. 12.

In Step 720, the system for simulating human lung for simulating human breathing is operated, and the operation of the system for simulating human lung can be operated by the method 600 for simulating human breathing which shown in FIG. 5.

In Step 730, a deposition step is performed, wherein the observing-substance of the substance source 400 is transported into the imitating lung device 100 via the gas vent 114.

In Step 740, an observing step is performed, wherein the observing step is for observing a deposition situation of the observing-substance in the air channels 131 and in the imitating alveolar regions 132.

When the experimental parameters of the method 600 for simulating human breathing is adjusted, it makes the system for simulating human lung respectively simulate the normal lung, the restrictive lung and the obstructive lung to be able to research the deposition situations of the observing-substance in different types of lung.

Figure 14:
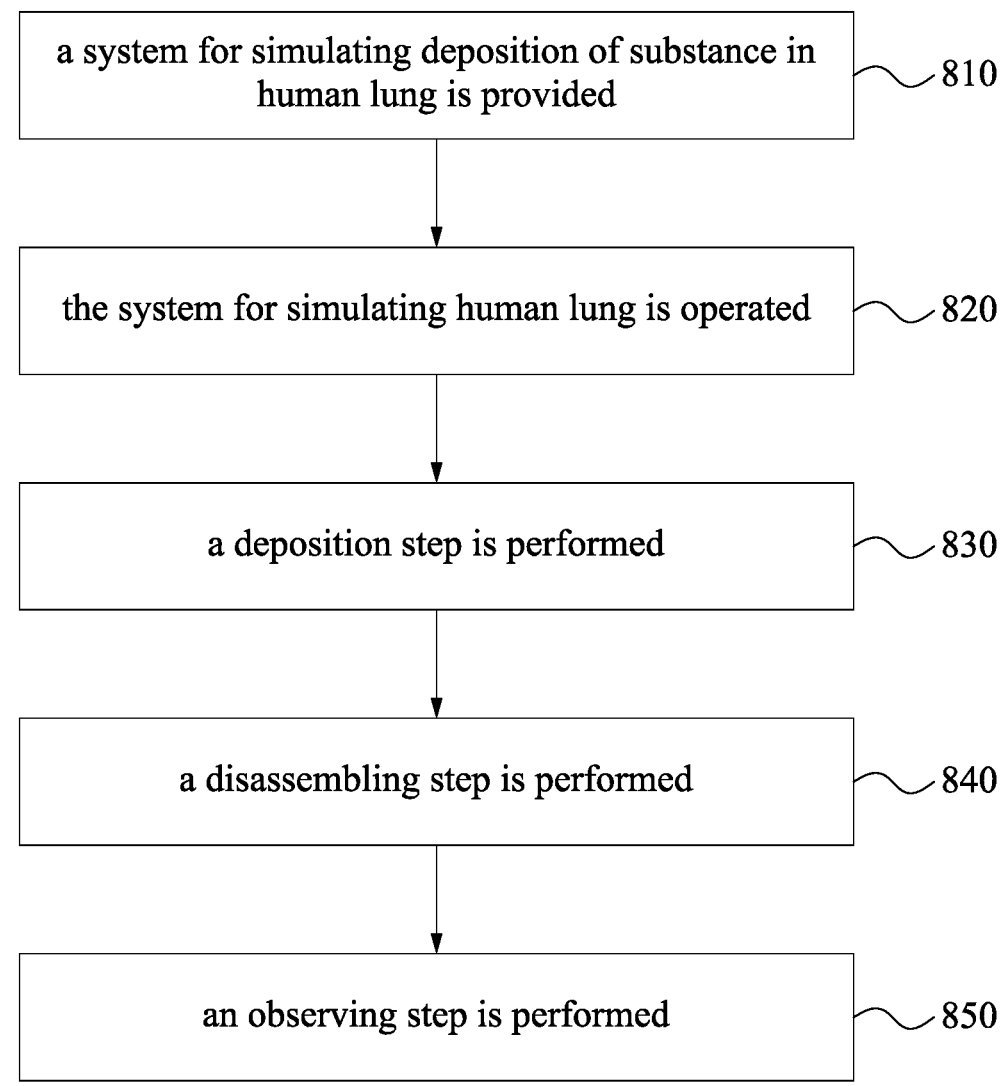
FIG. 14 is a flow chart of a method for simulating deposition of substance in human lung according to yet further another embodiment of the present disclosure.

FIG. 14 is a flow chart of a method 800 for simulating deposition of substance in human lung according to yet further another embodiment of the present disclosure. In FIG. 14, the method 800 for simulating deposition of substance in human lung includes Step 810, Step 820, Step 830, Step 840 and Step 850.

In Step 810, a system for simulating deposition of substance in human lung is provided, and the details of the system for simulating deposition of substance in human lung can be referred to FIG. 11 and FIG. 12. In this embodiment, the airway layer 130 of the imitating lung device 100 is a five-layered structure and includes, as shown in FIG. 3, in order from one side of the airway layer to the other side thereof, the second imitating alveolar region layer 133B, the first imitating alveolar region layer 133A, the air channel layer 135, the another first imitating alveolar region layer 133A and the another second imitating alveolar region layer 133B, wherein each first imitating alveolar region layer 133A is detachably connected with the air channel layer 135.

In Step 820, the system for simulating human lung is operated, and the details thereof can be referred to Step 720 of FIG. 13.

In Step 830, a deposition step is performed, and the details thereof can be referred to the step 730 of FIG. 13.

In Step 840, a disassembling step is performed, wherein each of the first imitating alveolar region layers 133A is disposed separately from the air channel layer 135 and then performing an observing step.

In Step 850, an observing step is performed, wherein the observing step is for observing a deposition situation of the observing-substance in the air channels 131 and in the imitating alveolar regions 132. Because the first imitating alveolar region layer 133A and the air channel layer 135 are detachably connected, the deposited substance can be directly collected or the observation is directly performed by using an instrument, such as probe.

Testing Result of Method for Simulating Deposition of Substance in Human Lung

In the system for simulating deposition of substance in human lung of FIG. 11, the substance source 400 is a vibrating mesh nebulizer (MBPN002, Pocket Air), the mesh diameter is about 3.4 μm, and a fluorescent solution forms a fluorescent aerosol by the vibrating mesh nebulizer so as to serve as the observing-substance. In this experiment, the molecular weight of the fluorescent aerosol is 332.31 g/mol, the mess medium aerodynamic diameter is about 4.21 μm, thereby the molecular weight of the fluorescent aerosol equivalent to the molecular weight of a nebulized form of the general inhaled medicine, along with its size beneficial for depositing in the branched structure of the 15th generation to the 19th generation, improving the reliability of the testing result. The flow rate that the pump 200 extracts the liquid is 80 rpm, cooperating to a pressure drop of 11.18 kPa, to simulate breathing of the normal lung for 30 minutes, so that the fluorescent aerosol is taken into the imitating lung device 100 via the exposure chamber 500 to deposit in the air channels 131 and the imitating alveolar regions 132. After the test, a fluorescence microscope (Nikon Eclipse TS100 microscope with Nikon C-SHG fluorescent light source) is used for observation, cooperating with a digital camera system (LeadView 2800AM-FL) and an image software (ImageJ software (NIH)), to calculate the aerosol density of the fluorescent aerosol.

Figure 15:
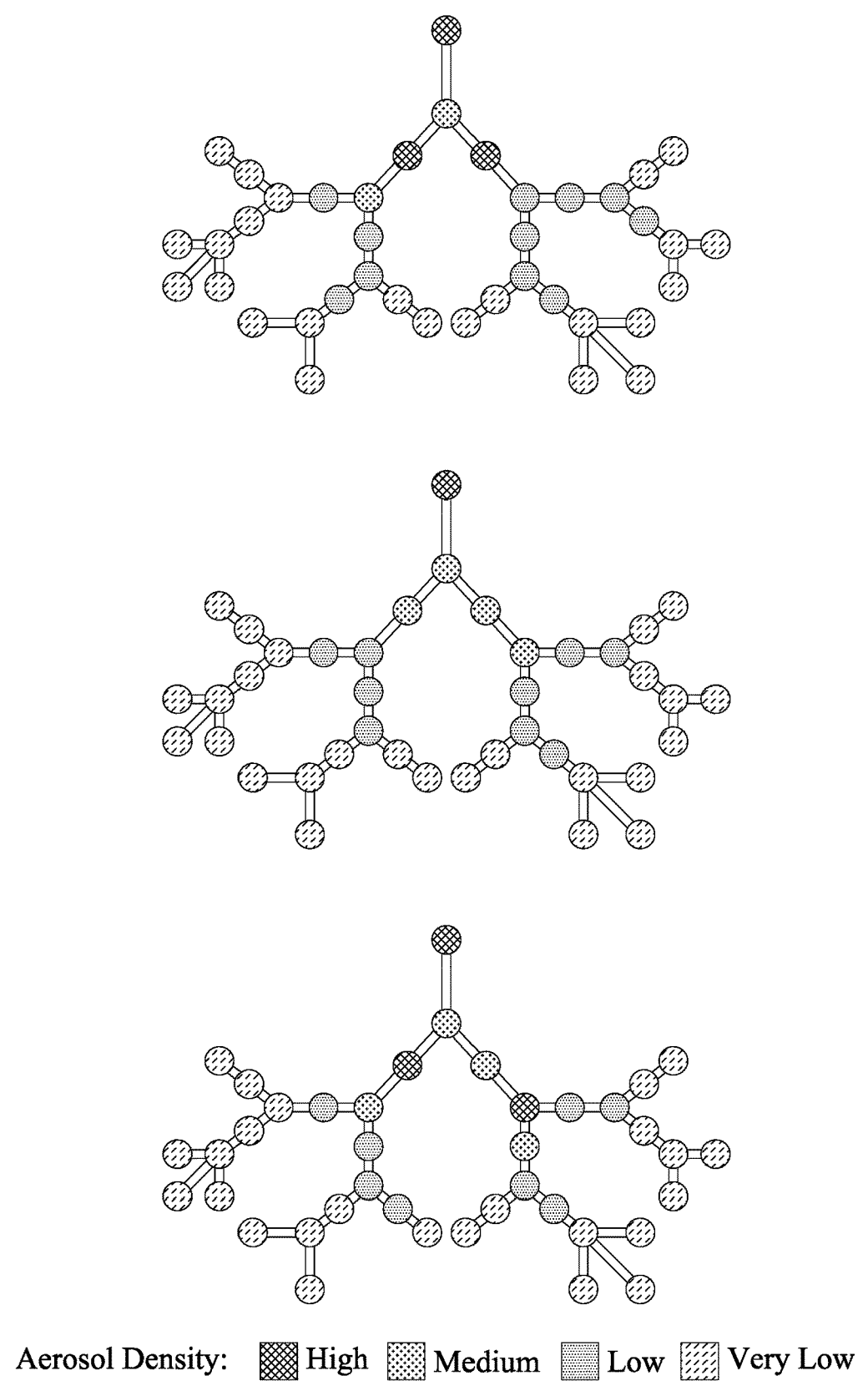

Please refer to FIG. 15, which is a simulation result of the method 700 for simulating deposition of substance in human lung in FIG. 13. In FIG. 15, the results from top to bottom are the results of experiments for three times under the same condition. Each circle represents the range that is observed by the fluorescence microscope, in other words, total 40 places are chosen to observe, and the aerosol density of each circle is calculated. The deposition results are divided into four grades: "High" presents the aerosol density more than or equal to 20%, "Medium" presents the aerosol density more than or equal to 10% and less than 20%, "Low" presents the aerosol density more than or equal to 1% and less than 10%, and "Very Low" presents the aerosol density less than 1%. According to FIG. 15, under the same condition, the results of experiments for three times are similar, showing that the method for simulating deposition of substance in human lung of the present disclosure has reproducibility.

Figure 16:
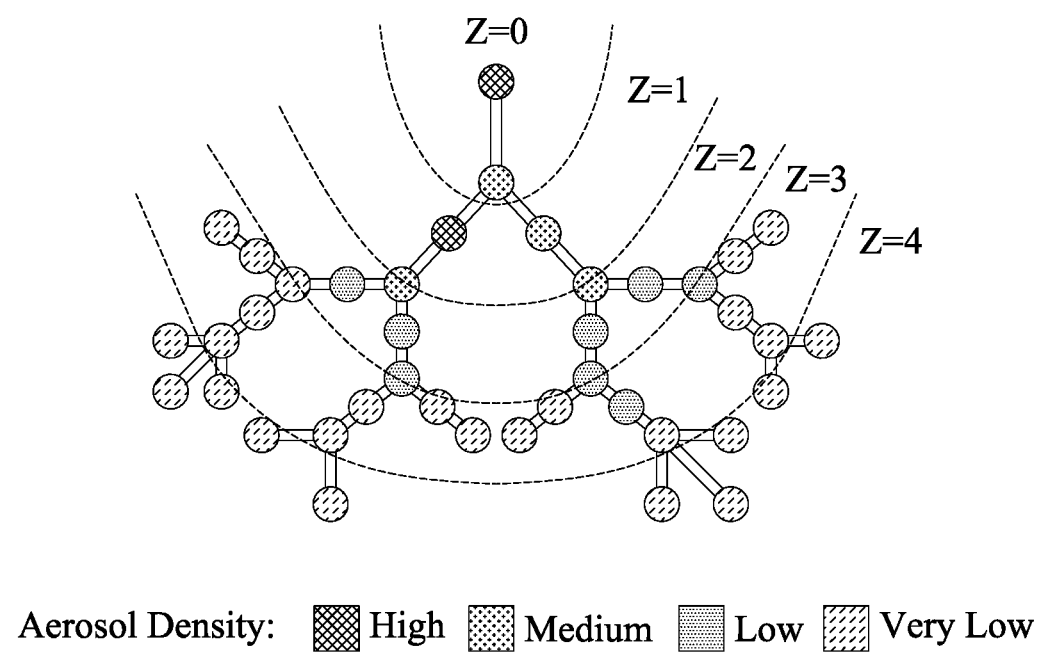
Figures 17, 18:
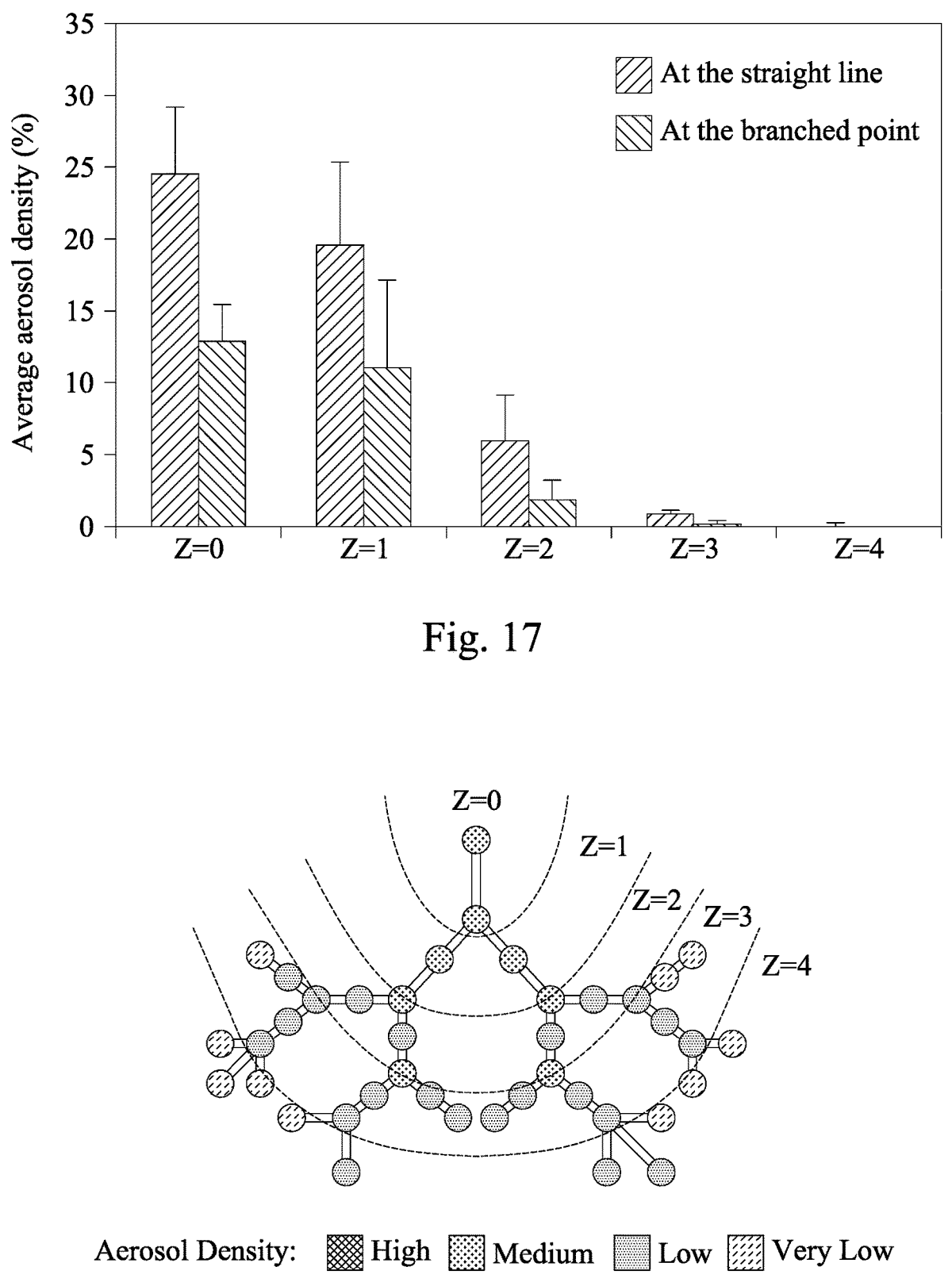

Please refer to FIG. 16, which is an integrated result of FIG. 15, in which the aerosol density values calculated from the three experiments at the same circle in FIG. 15 are taken an average, and then, is presented in FIG. 17, wherein Z=0 presents the branched structure of the 15th generation, Z=1 presents the branched structure of the 16th generation, Z=2 presents the branched structure of the 17th generation, Z=3 presents the branched structure of the 18th generation, Z=4 presents the branched structure of the 19th generation. According to FIG. 16, along with the increase of the generation number, the aerosol density is decreased progressively.

Please refer to FIG. 17, which is a bar chart of FIG. 16, in which "at the straight line" means the aerosol density obtained from the circle at the straight line (that is not at the branched point) of the air channels 131 in FIG. 16 to calculate the average aerosol density, "at the branched point" means the aerosol density obtained from the circle at the branched point of the air channels 131 to calculate the average aerosol density, the description is as followed. In FIG. 16, when Z=0, only one circle (that is the most top circle) is at the straight line, and only one circle (the second circle from top) is at the branched point, so the value at the straight line of Z=0 in FIG. 17 is the aerosol density of the most top circle in FIG. 16, and the value at the branched point of Z=0 in FIG. 17 is the aerosol density of the second circle from top to bottom in FIG. 16. In FIG. 16, when Z=1, two circles are at the straight line, and two circles are at the branched point, so the value at the straight line of Z=1 in FIG. 17 is the average aerosol density of the two circles which are at the straight line in FIG. 16, and the value at the branched point of Z=1 in FIG. 17 is the average aerosol density of the two circles which are at the branched point of Z=1 in FIG. 16, and so on, for about the calculation method of the average aerosol density at the straight line and at the branched point of Z=2-4. According to FIG. 17, when the generation number is the same, the average aerosol density at the straight line all are larger than the average aerosol density at the branched point, along with the increase of the generation number, the average aerosol density at the straight line and the average aerosol density at the branched point are decreased progressively. When the deposition of the substance is researched, the observation position can be flexibly chosen according to the actually demand, for example, the position at the straight line or at the branched point is chosen.

Figures 19, 20:
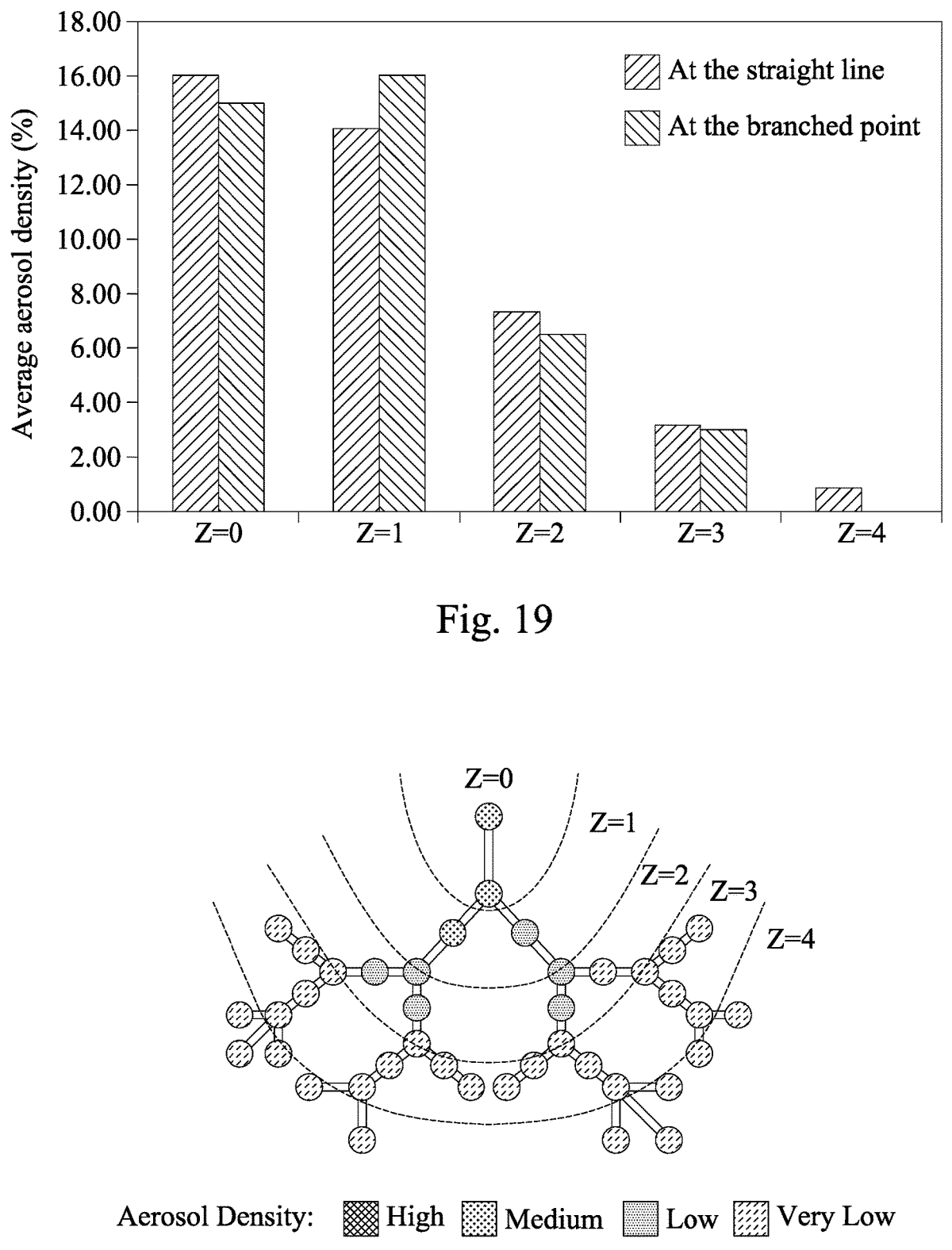

The pressure drop of the aforementioned experiment is changed to 22.63 kPa, the other steps are the same to simulate the breathing of the obstructive lung and for 30 minutes. Please refer to FIG. 18 and FIG. 19, FIG. 18 is another simulation result of the method 700 for simulating deposition of substance in human lung in FIG. 13, and FIG. 19 is a bar chart of FIG. 18. Specifically, FIG. 18 shows the situation that simulates the deposition of substance in the obstructive lung. Comparison with FIG. 16 and FIG. 17, in FIG. 18 and FIG. 19, the fluorescent aerosol has a higher aerosol density at the 18th generation and the 19th generation, showing that the distributing region of the aerosol is wider, which attributing to that the obstructive lung has the characteristics that the gas is not easily exhausted, so as to increase the probability of the fluorescent aerosol to impact and attach to the side wall of the air channels 131.

Figures 21, 22:
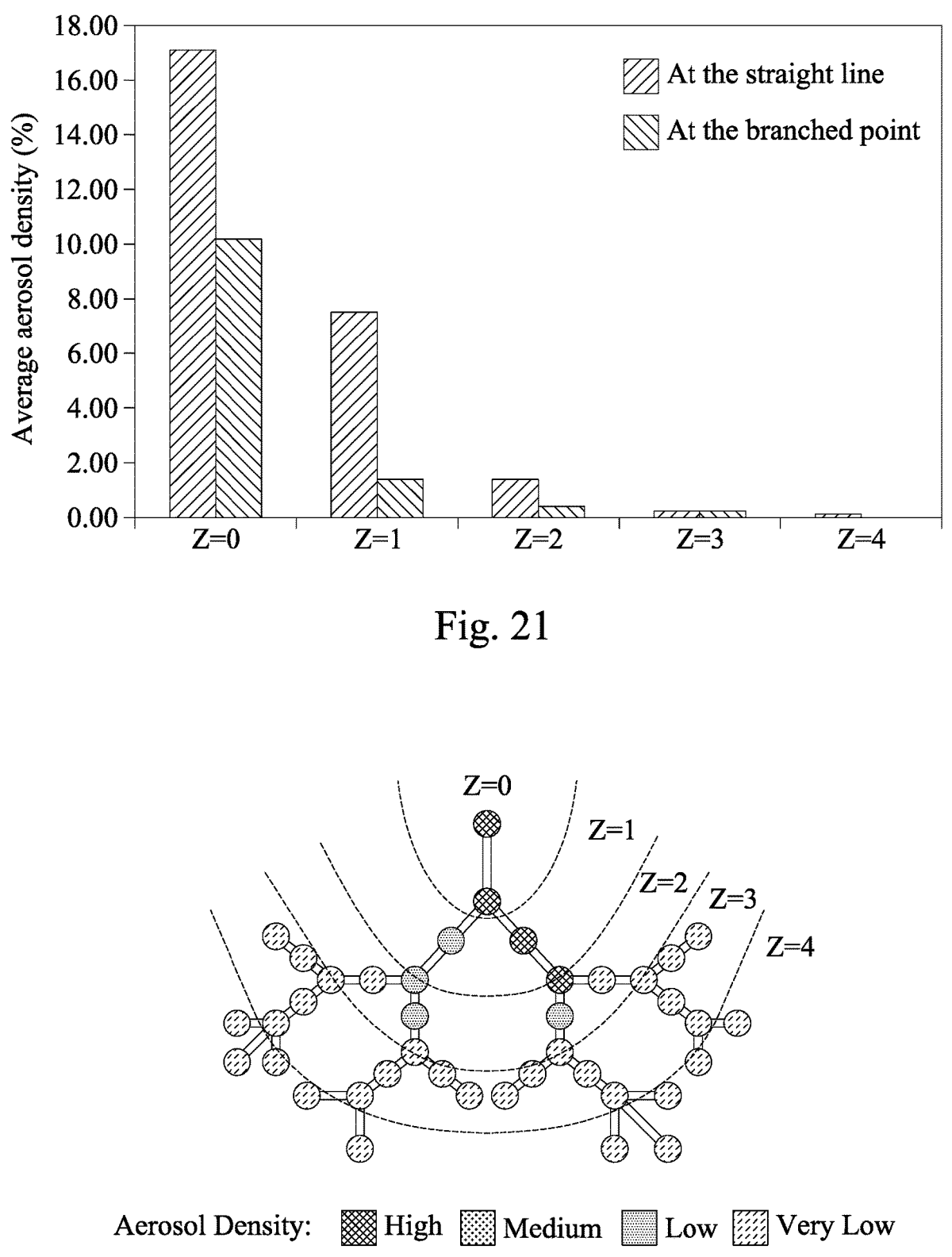

The pressure drop of the aforementioned experiment is changed to 0.35 kPa, the other steps are the same to simulate the breathing of the restrictive lung and for 30 minutes. Please refer to FIG. 20 and FIG. 21, FIG. 20 is still another simulation result of the method 700 for simulating deposition of substance in human lung in FIG. 13, FIG. 21 is a bar chart of FIG. 20. Specifically, FIG. 20 shows the situation that simulates the deposition of substance in the restrictive lung. Comparison with FIG. 16 and FIG. 17, in FIG. 20 and FIG. 21, the fluorescent aerosol all has a lower aerosol density at the 15th generation to the 19th generation, indicating that the deposition efficiency is worse, which attributing to that the restrictive lung has lower inhalation and exhalation due to loss of its elasticity.

According to the aforementioned experiments, the deposition results in FIG. 15 to FIG. 21 are corresponded to the different types of pulmonary symptom, showing the present disclosure can efficiently simulate the deposition situation of substance in human lung, and according to the actually demand, such as the pulmonary situation of a patient, to adjust the value of the pump and the pressure drop for simulating the operation mode of the pulmonary of the patient so as to simulate the deposition situation of substance in the pulmonary of the patient.

Figure 23:
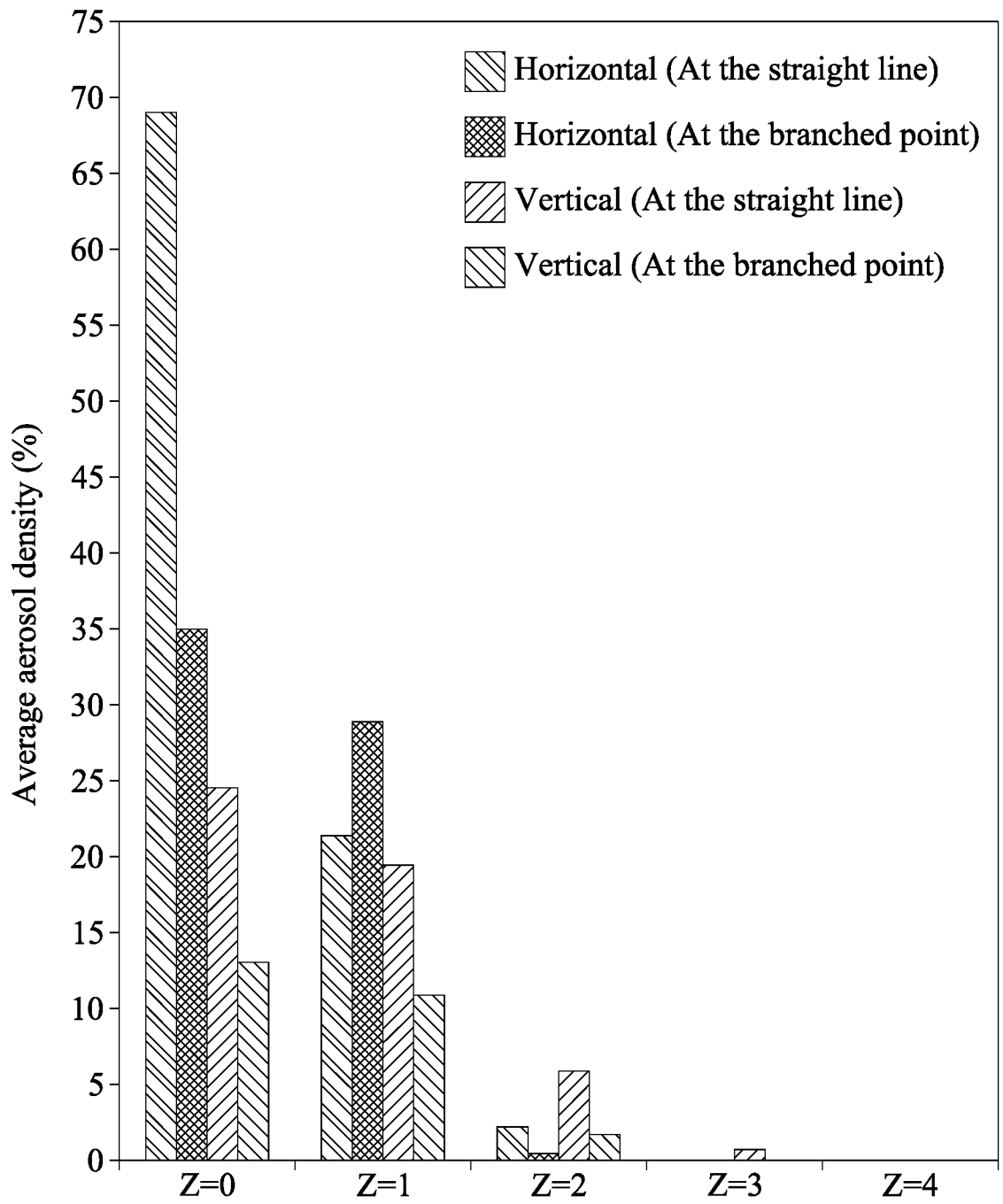
FIG. 23 is a bar chart of FIG. 16 and FIG. 22.

Please refer to FIG. 22 and FIG. 23, FIG. 22 is further another simulation result of the method 700 for simulating deposition of substance in human lung in FIG. 13, FIG. 23 is a bar chart of FIG. 16 and FIG. 22, wherein FIG. 22 uses the system for simulating deposition of substance in human lung in FIG. 12 and performs the method 700 for simulating deposition of substance in human lung in FIG. 13, that is, the imitating lung device 100 is horizontal disposed, and the other steps are the same as FIG. 16. According to FIG. 22 and FIG. 23, when the imitating lung device 100 is horizontal disposed, the average aerosol density of the 15th generation reaches to 69%, the average aerosol density of the 17th generation is very low, indicating that when the imitating lung device 100 is horizontal disposed, the fluorescent aerosol is not easy to reach the deep of the pulmonary. Therefore, according to the lesion position of the pulmonary of a patient, the different posture for inhalation can be used.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:
1. An imitating lung device, comprising:
a first liquid accommodating layer having an outer surface portion and an inner surface portion and comprising:
a liquid inlet, a liquid outlet and a gas vent respectively disposed on the outer surface portion; and
a first liquid chamber formed in the inner surface portion;
a first elastic membrane disposed on the inner surface portion of the first liquid accommodating layer;
an airway layer disposed on one surface of the first elastic membrane away from the first liquid accommodating layer and comprising a plurality of air channels and a plurality of imitating alveolar regions, wherein the imitating alveolar regions are communicated with the air channels, the air channels are configured to simulate a branched structure of the 15th generation to the 19th generation of a human lung, and the imitating alveolar regions are configured to simulate a branched structure of the 20th generation to the 23th generation of a human lung;
a second elastic membrane disposed on a surface of the airway layer away from the first elastic membrane; and
a second liquid accommodating layer disposed on a surface of the second elastic membrane away from the airway layer, and a second liquid chamber formed in an inner surface portion of the second liquid accommodating layer;
wherein the first elastic membrane directly covers the first liquid chamber and one side of the imitating alveolar regions, the second elastic membrane directly covers the second liquid chamber and the other side of the imitating alveolar regions, a plurality of deformable chambers are defined by the first elastic membrane, the imitating alveolar regions and the second elastic membrane, the liquid inlet, the liquid outlet, the first liquid chamber and the second liquid chamber are communicated with one another, and the gas vent, the air channels and the deformable chambers are communicated with one another.

2. The imitating lung device of claim 1, wherein the imitating lung device is a screwless structure.

3. The imitating lung device of claim 1, wherein the first liquid accommodating layer, the first elastic membrane, the airway layer, the second elastic membrane and the second liquid accommodating layer respectively comprises at least one positioning part, and the positioning parts are corresponded to one another.

4. The imitating lung device of claim 1, wherein the airway layer is a five-layered structure and comprises, in order from one side of the airway layer to the other side thereof, a second imitating alveolar region layer, a first imitating alveolar region layer, an air channel layer, another first imitating alveolar region layer and another second imitating alveolar region layer, wherein each of the first imitating alveolar region layers is detachably connected with the air channel layer.

5. The imitating lung device of claim 4, wherein the first liquid accommodating layer is detachably connected with the first elastic membrane and the second liquid accommodating layer is detachably connected with the second elastic membrane.

6. The imitating lung device of claim 1, wherein the first liquid accommodating layer, the first elastic membrane, the airway layer, the second elastic membrane and the second liquid accommodating layer are made of a transparent material.

7. A system for simulating human lung, comprising:
the imitating lung device of claim 1;
a liquid-storage tank communicated with the liquid inlet of the first liquid accommodating layer; and
a pump connected with the liquid outlet of the first liquid accommodating layer and the liquid-storage tank, respectively.

8. A method for simulating human breathing, comprising:
providing the system for simulating human lung of claim 7;
performing a liquid filling step, in which a liquid is filled into the first liquid chamber, the second liquid chamber and the liquid-storage tank, wherein the liquid is full in the first liquid chamber and the second liquid chamber and continuously flow from the liquid-storage tank into the first liquid chamber and the second liquid chamber via the liquid inlet;
performing a simulating inhalation step, in which the pump is turned on to extract the liquid of the first liquid chamber and the second liquid chamber to the liquid-storage tank so as to make a volume of the deformable chambers increase due to a decreased liquid-pressure and then make an outside gas flow into the deformable chambers via the gas vent; and
performing a simulating exhalation step, in which the pump is turned off so as to make the volume of the deformable chambers decrease due to an increased liquid-pressure so as to let the gas in the deformable chambers exhaust from the gas vent.

9. The method for simulating human breathing of claim 8, wherein in the simulating inhalation step, a starting time of the pump is 2 seconds, and in the simulating exhalation step, a closing time of the pump is 2 seconds.

10. The method for simulating human breathing of claim 8, wherein a flow rate of the liquid extracted by the pump is 0.05-50 mL/min, and a pressure drop between the liquid-storage tank and the liquid inlet is more than 0 kPa and less than or equal to 25 kPa.

11. The method for simulating human breathing of claim 8, wherein the liquid is a water.

12. A system for simulating deposition of substance in human lung, comprising:
a substance source for providing an observing-substance; and
the system for simulating human lung of claim 7;
wherein the substance source is communicated with the gas vent of the imitating lung device.

13. The system for simulating deposition of substance in human lung of claim 12, further comprising:
an exposure chamber comprising two openings, wherein the two openings are disposed at two opposite sides of the exposure chamber, respectively, one of the two openings is connected with the substance source, and the other of the two openings is connected with the gas vent of the imitating lung device.

14. The system for simulating deposition of substance in human lung of claim 12, wherein the imitating lung device is vertically disposed or horizontally disposed.

15. The system for simulating deposition of substance in human lung of claim 12, wherein the substance source is a nebulizer.

16. The system for simulating deposition of substance in human lung of claim 12, wherein the observing-substance is a fluorescent aerosol.

17. The system for simulating deposition of substance in human lung of claim 12, wherein the observing-substance is a medicine.

18. The system for simulating deposition of substance in human lung of claim 12, wherein the observing-substance is a pollutant in a polluted air.

19. A method for simulating deposition of substance in human lung, comprising:
providing the system for simulating deposition of substance in human lung of claim 12;
operating the system for simulating human lung so as to simulate human breathing;
performing a deposition step, wherein the observing-substance of the substance source is transported into the imitating lung device via the gas vent; and
performing an observing step, wherein the observing step is for observing a deposition situation of the observing-substance in the air channels and in the imitating alveolar regions.

20. The method for simulating deposition of substance in human lung of claim 19, wherein the airway layer is a five-layered structure and comprises, in order from one side of the airway layer to the other side thereof, a second imitating alveolar region layer, a first imitating alveolar region layer, an air channel layer, another first imitating alveolar region layer and another second imitating alveolar region layer, wherein each of the first imitating alveolar region layer is detachably connected with the air channel layer, and the method for simulating deposition of substance in human lung further comprises:

performing a disassembling step for separating the each first imitating alveolar region layer and the air channel layer.

\* \* \* \* \*